(12) United States Patent
Sakakihara

(10) Patent No.: US 9,529,350 B2
(45) Date of Patent: Dec. 27, 2016

(54) INFORMATION PROCESSING APPARATUS, INFORMATION PROCESSING METHOD, AND MEDIUM

(71) Applicant: FUJITSU LIMITED, Kawasaki-shi, Kanagawa (JP)

(72) Inventor: Hironori Sakakihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 967 days.

(21) Appl. No.: 13/707,998

(22) Filed: Dec. 7, 2012

(65) Prior Publication Data

US 2013/0245790 A1    Sep. 19, 2013

(30) Foreign Application Priority Data

Mar. 19, 2012  (JP) ................................. 2012-062811

(51) Int. Cl.
  *G05B 19/02*    (2006.01)
  *G06Q 30/02*    (2012.01)
  (Continued)

(52) U.S. Cl.
  CPC .............. *G05B 19/02* (2013.01); *G01S 5/0009* (2013.01); *G06Q 30/02* (2013.01); *G06F 1/3203* (2013.01); *G06F 1/329* (2013.01); *H04W 52/0258* (2013.01)

(58) Field of Classification Search
  CPC ....... G05B 19/02; G06Q 30/02; G01S 5/0009; H04W 52/0258; G06F 1/329; G06F 1/3203
  See application file for complete search history.

(56) References Cited

U.S. PATENT DOCUMENTS

| 6,484,033 B2* | 11/2002 | Murray ................. H04M 3/432 |
| | | 455/456.3 |
| 2007/0185645 A1* | 8/2007 | Chao ................... G08G 1/0104 |
| | | 701/533 |

(Continued)

FOREIGN PATENT DOCUMENTS

| JP | 2004-48473 | 2/2004 |
| JP | 2007-251425 | 9/2007 |

(Continued)

OTHER PUBLICATIONS

Office Action issued Sep. 15, 2015 in Japanese Patent Application No. 2012-062811 (with partial English translation).

(Continued)

*Primary Examiner* — Alexander Satanovsky
*Assistant Examiner* — John Kuan
(74) *Attorney, Agent, or Firm* — Oblon, McClelland, Maier & Neustadt, L.L.P.

(57) ABSTRACT

An information processing apparatus controls position measurement performed by a position measurement device. The apparatus includes a memory and a processor that executes a process in the memory. The process includes acquiring schedule information associated with the position measurement device and including a start time and an end time, acquiring position information acquired by the position measurement device, and extending a position measurement cycle of the position measurement device compared to a position measurement cycle before the start time of the schedule information when positions that respectively correspond to a plurality of pieces of position information acquired between the start time and the end time are in a given area.

17 Claims, 24 Drawing Sheets

(51) Int. Cl.
    *G01S 5/00*     (2006.01)
    *H04W 52/02*    (2009.01)
    *G06F 1/32*     (2006.01)

(56) References Cited

U.S. PATENT DOCUMENTS

| | | | | |
|---|---|---|---|---|
| 2010/0070456 A1* | 3/2010 | Sugihara | ................. | G06N 5/02 |
| | | | | 706/54 |
| 2010/0255781 A1* | 10/2010 | Wirola | ................... | G01S 19/34 |
| | | | | 455/41.2 |
| 2013/0227061 A1* | 8/2013 | Liu | ........................ | H04L 67/18 |
| | | | | 709/217 |

FOREIGN PATENT DOCUMENTS

| | | |
|---|---|---|
| JP | 2009-198458 | 9/2009 |
| JP | 2009-267886 | 11/2009 |
| JP | 2011-27500 | 2/2011 |

OTHER PUBLICATIONS

Japanese Office Action dated Apr. 12, 2016, issued in Japanese Patent Application No. 2012-062811 (with partial English translation).

\* cited by examiner

| SERVICE ID | SERVICE PROVISION AREA INFORMATIO |
|---|---|
| 0001 | (X1,Y1),(X2,Y2),(X3,Y3),(X4,Y4) |
|  | ... |
| 0002 | ... |

| USER ID | POSITION INFORMATION | POSITIONING TIME |
|---------|----------------------|------------------|
| 1000    | (X1,Y1)              | 2011.10.14 12:00:00 |
|         | (X2,Y2)              | 2011.10.14 12:00:00 |
|         | ...                  | ...              |
| 1001    | ...                  | ...              |

| USER ID | POSITIONING CYCLE | POSITIONING ACCURACY |
|---------|-------------------|----------------------|
| 1000 | 3 MINUTES | LOW |
| 1001 | ... | ... |
| ... | ... | ... |

FIG. 9

| USER ID 1000 | | | |
|---|---|---|---|
| SCHEDULE ID | START TIME | END TIME | |
| 0351 | 2012.2.10 13:00 | 2012.2.10 14:00 | |
| 0352 | 2012.2.11 16:30 | 2012.2.11 18:30 | |
| ... | ... | ... | |

(530, 530 — overlapping tables for USER ID 1000 and USER ID 1001, with END TIME values 2012.2.10 12:00, 2012.2.11 18:00, ...)

| USER ID | POSITIONING CYCLE | POSITIONING ACCURACY | NEXT POSITIONING TIME |
|---|---|---|---|
| 1000 | POSITIONING STOP | LOW | 12:30:00 |
| | ... | ... | ... |
| 1001 | ... | ... | ... |

FIG. 21

| USER ID 0001 | | | |
|---|---|---|---|
| SCHEDULE ID | START TIME | END TIME | CO-PARTICIPANT INFORMATION |
| 0351 | 2012.2.10 13:00 | 2012.2.10 14:00 | 0010,0013,0014,0020 |
| 0352 | 2012.2.11 16:30 | 2012.2.11 18:30 | 00010,0015,0020,0022 |
| ... | ... | ... | ... |

550

| USER ID 0002 | | | |
|---|---|---|---|
| SCHEDULE ID | START TIME | END TIME | CO-PARTICIPANT INFORMATION |
| | | | 0013,0014,0021 |
| | | | 0019,0022,0038 |
| | | | ... |

550

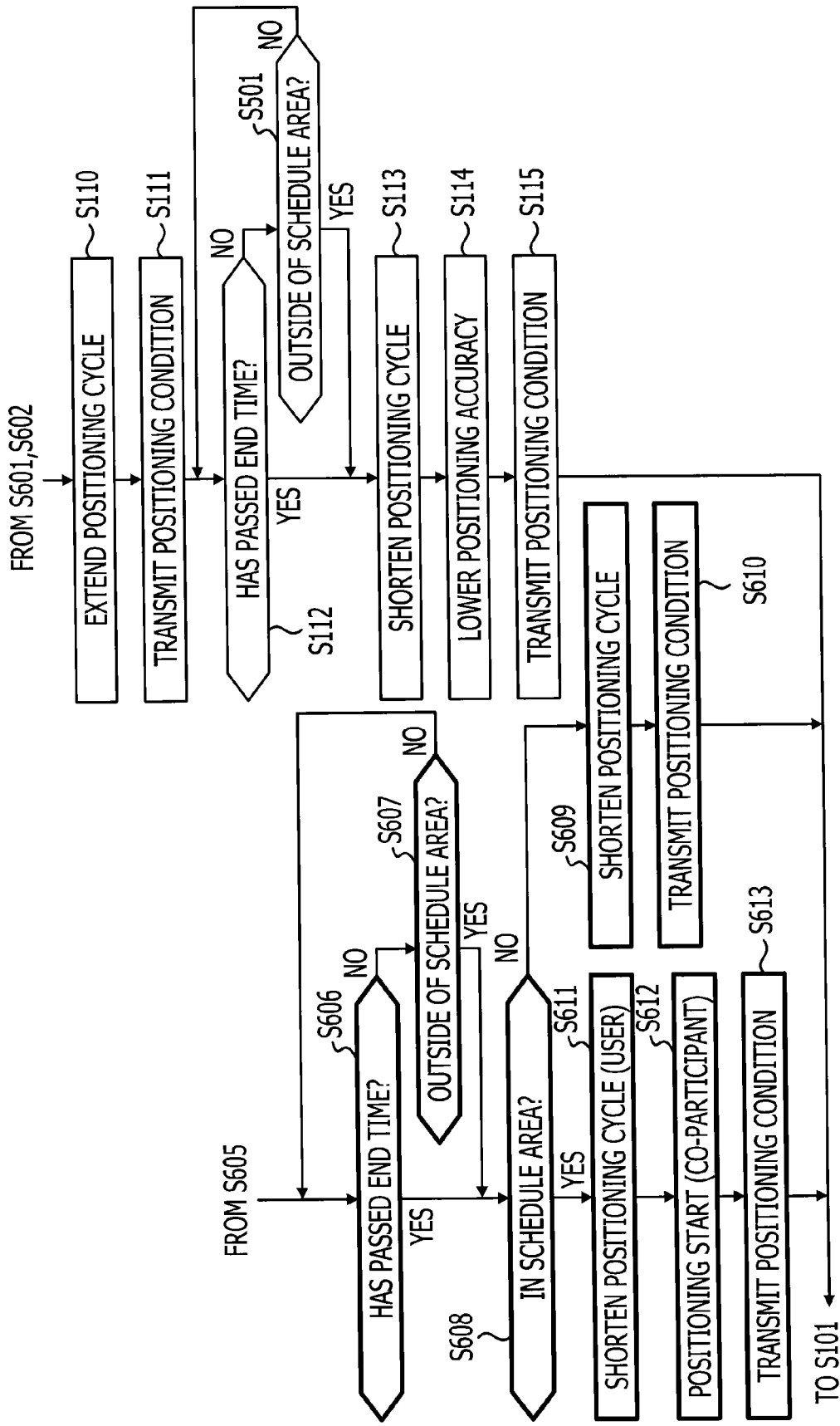

INFORMATION PROCESSING APPARATUS, INFORMATION PROCESSING METHOD, AND MEDIUM

CROSS-REFERENCE TO RELATED APPLICATION

This application is based upon and claims the benefit of priority of the prior Japanese Patent Application No. 2012-062811, filed on Mar. 19, 2012, the entire contents whose are incorporated herein by reference.

FIELD

The embodiments discussed herein are related to an information processing apparatus, an information processing method, and a medium.

BACKGROUND

A technique to acquire position information for a user by using various sensors that are mounted on a portable terminal device such as a smart phone has been developed in recent years. Various services using a user's position information has been started as well.

For example, when the current position of a portable terminal device is measured by using a position information acquiring unit such as global positioning system (GPS) module that is mounted on the portable terminal device and the portable terminal device approaches an area (a shop, a station, or the like) designated by a service provider, there is a service that distributes recommendation information, such as an application and coupons that may be used in the area, to the portable terminal device from a central server.

In a service such as described above, the portable terminal device executes an installed application so as to regularly acquire the current position of the portable terminal device from GPS or the like and transmits position information for the acquired current position to the central server. The central server determines whether the user is in a service area based on the position information received from the portable terminal device, and distributes recommendation information such as an application and a coupon to the portable terminal device of the user when the user is in the service area.

In the above-described configuration, because the server determines whether the user is in the service area, an application installed in the portable terminal device does not know which area a service that is registered in the portable terminal device belongs to. Therefore, the portable terminal device regularly transmits position information for the portable terminal device to the central server, based on the installed application.

As the period between transmissions is increased, power consumption may be reduced. However, the greater the period of transmission from the portable terminal device, the greater the chance that, during the time between transmissions, the portable terminal device will completely pass by a position where a service is provided. Therefore, it is preferable that the portable terminal device continue to transmit a user's position information to the central server with a short cycle so that the user is provided with an optimal service corresponding to the current position of the portable terminal device.

Japanese Laid-open Patent Publication No. 2009-198458 and Japanese Laid-open Patent Publication No. 2011-27500 are examples of related art.

SUMMARY

According to an aspect of the invention, an information processing apparatus that controls position measurement performed by a position measurement device, the apparatus including a memory, and a processor that executes a process in the memory, the process including acquiring schedule information associated with the position measurement device and including a start time and an end time, acquiring position information acquired by the position measurement device, and extending a position measurement cycle of the position measurement device compared to a position measurement cycle before the start time of the schedule information when positions that respectively correspond to a plurality of pieces of position information acquired between the start time and the end time are in a given area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a schematic view of a service provision area information table according to the first embodiment;

FIG. 7 is a schematic view of a user position information table according to the first embodiment;

FIG. 8 is a schematic view of a position measurement conditions table according to the first embodiment;

FIG. 9 is a schematic view of a schedule table according to the first embodiment;

FIG. 15 is a schematic view of a position measurement information table according to the second embodiment;

FIG. 21 is a schematic view of a schedule table according to a fifth embodiment;

FIGS. 23A and 23B are flowchart of processing performed by a first server according to the fifth embodiment.

DESCRIPTION OF EMBODIMENTS

A first embodiment of the present disclosure is described below with reference to FIGS. 1 to 12.

First Embodiment

Figure 1:
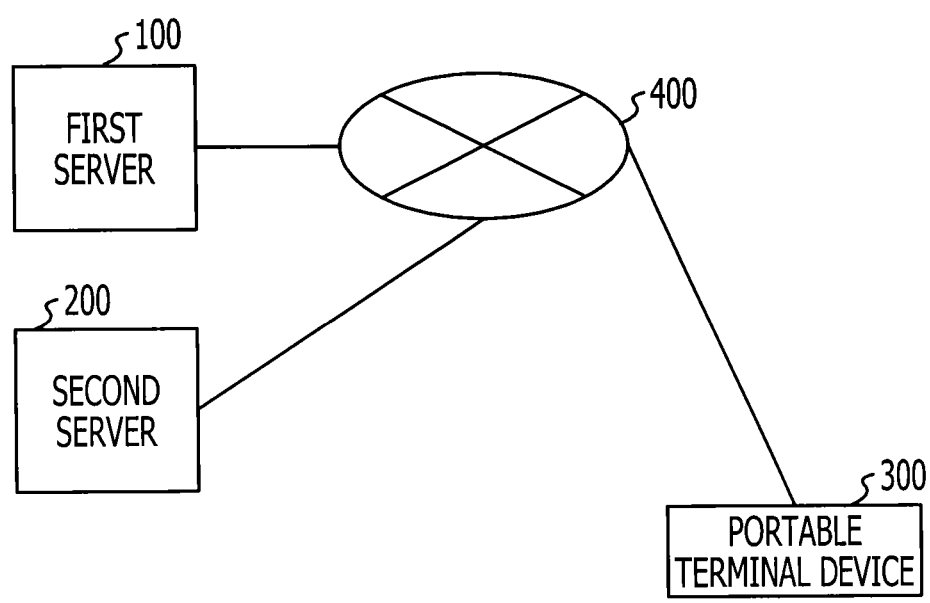
FIG. 1 is a schematic view of an information processing system according to a first embodiment.

FIG. 1 is a schematic view of an information processing system according to the first embodiment.

As depicted in FIG. 1, the information processing system according to the first embodiment includes a first server 100, a second server 200, a portable terminal device 300, and a network 400. The first server 100, the second server 200, and the portable terminal device 300 are mutually connected by the network 400.

Figure 2:
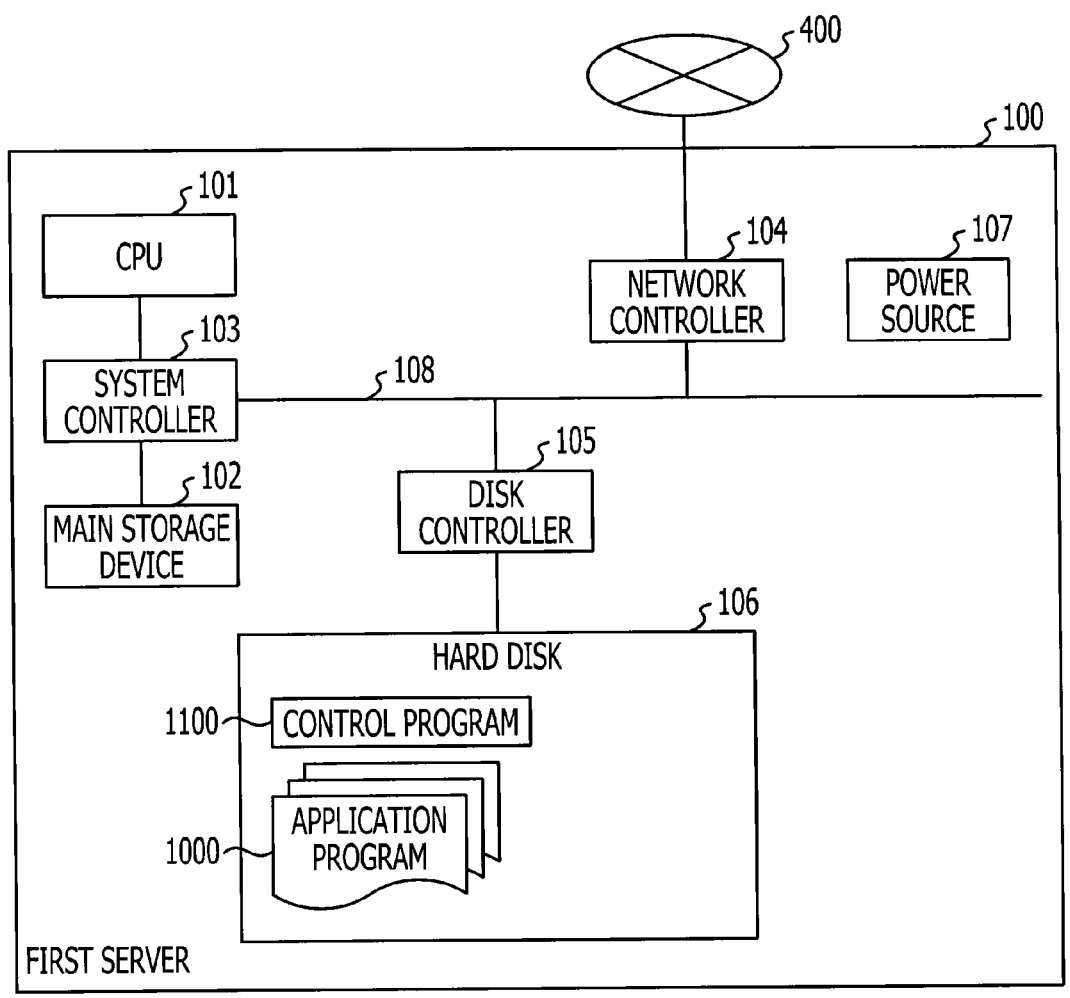
FIG. 2 is a schematic view of the hardware configuration of a first server according to the first embodiment.

FIG. 2 is a schematic view of the hardware configuration of the first server 100 according to the first embodiment.

As depicted in FIG. 2, the first server 100 according to the embodiment includes a central processing unit (CPU) 101, a main storage device 102, a system controller 103, a network controller 104, a disk controller 105, a hard disk 106, a power source 107, and a bus 108.

The CPU 101 controls the hardware of the first server 100. Furthermore, the CPU 101 reads out programs that are stored in the hard disk 106, loads the programs into the main storage device 102, and executes the programs that are loaded into the main storage device 102 to realize functions. Details of the functions will be described below.

The main storage device 102 stores programs that are executed by the CPU 101. Furthermore, the main storage device 102 is used as a work area of the CPU 101 and stores data that is used for processing performed by the CPU 101. A random access memory (RAM) may be used as the main storage device 102, for example.

The system controller 103 is connected to both the CPU 101 and the main storage device 102. The system controller 103 controls data transmission between the CPU 101 and the main storage device 102 as well as data transmission between the CPU 101 and the bus 108. Furthermore, the system controller 103 is connected to the network controller 104 and the disk controller 105 via the bus 108.

The network controller 104 is connected to the portable terminal device 300 via the network 400 and transmits and receives data to and from the portable terminal device 300. The power source 107 supplies power to hardware in the first server 100 via a power source line (not depicted).

The hard disk 106 is connected to the disk controller 105. The hard disk 106 stores programs. Examples of programs include an application program 1000 that is executed by the CPU 101 and a control program 1100 that allows the CPU 101 to execute control such as calling the application program 1000 and the like. A position measurement control program according to the embodiment is also stored in the hard disk 106. Furthermore, the hard disk 106 includes a first table storage unit 121 which will be described later. The first table storage unit 121 stores a service provision area information table 500, a user position information table 510, a position measurement conditions table 520, and the like.

Figure 3:
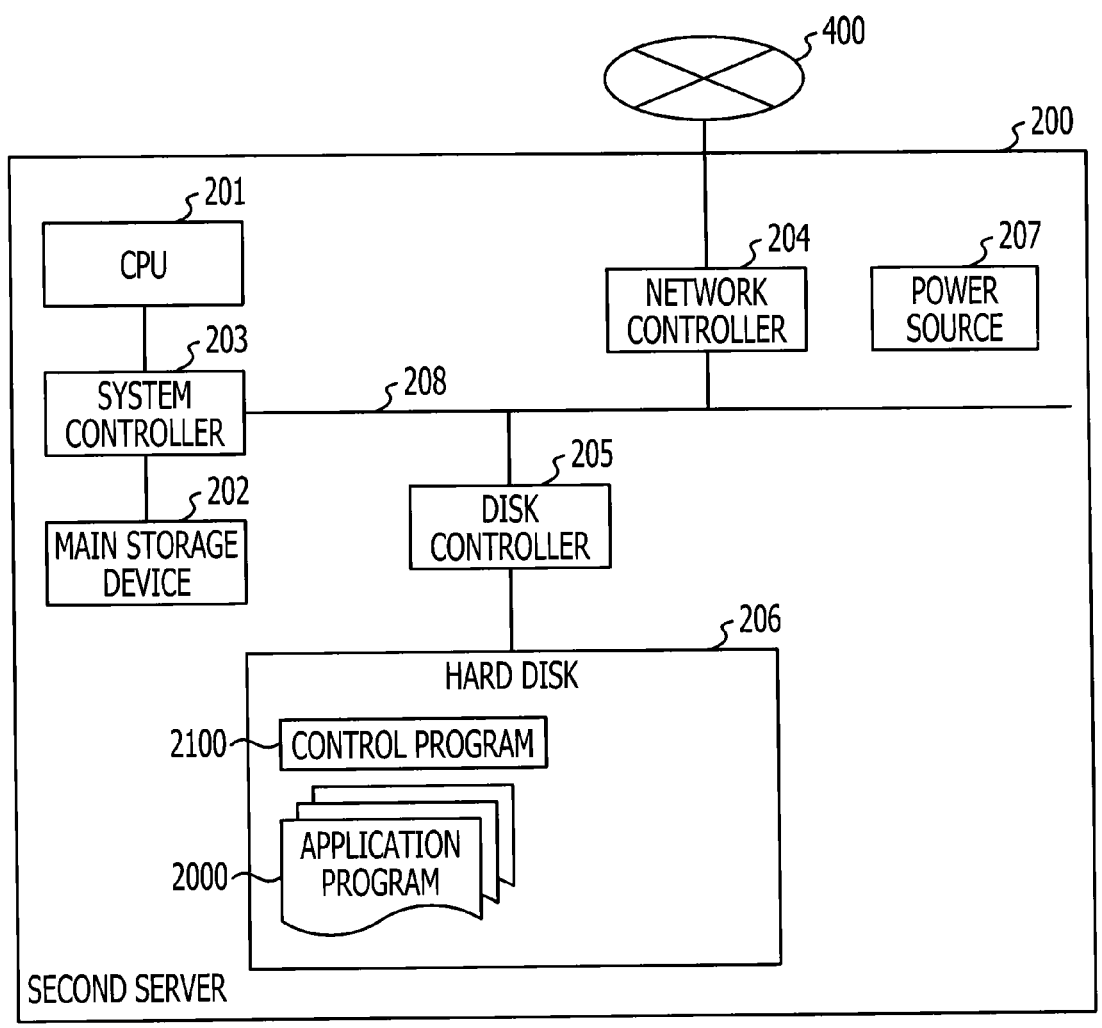
FIG. 3 is a schematic view of the hardware configuration of a second server according to the first embodiment.

FIG. 3 is a schematic view of the hardware configuration of the second server 200 according to the first embodiment.

As depicted in FIG. 3, the second server 200 according to the embodiment includes a CPU 201, a main storage device 202, a system controller 203, a network controller 204, a disk controller 205, a hard disk 206, a power source 207, and a bus 208.

The CPU 201, the main storage device 202, the system controller 203, the network controller 204, the disk controller 205, the hard disk 206, the power source 207, and the bus 208 have equivalent configurations to those of the CPU 101, the main storage device 102, the system controller 103, the network controller 104, the disk controller 105, the hard disk 106, the power source 107, and the bus 108 of the first server 100, respectively. However, the hard disk 206 does not include the application program 1000 and the control program 1100 that are stored in the first server 100, but includes a control program 2100 and an application program 2000. Furthermore, the hard disk 206 includes a second table storage unit 221 that will be described later. The second table storage unit 221 stores a schedule table 530.

Figure 4:
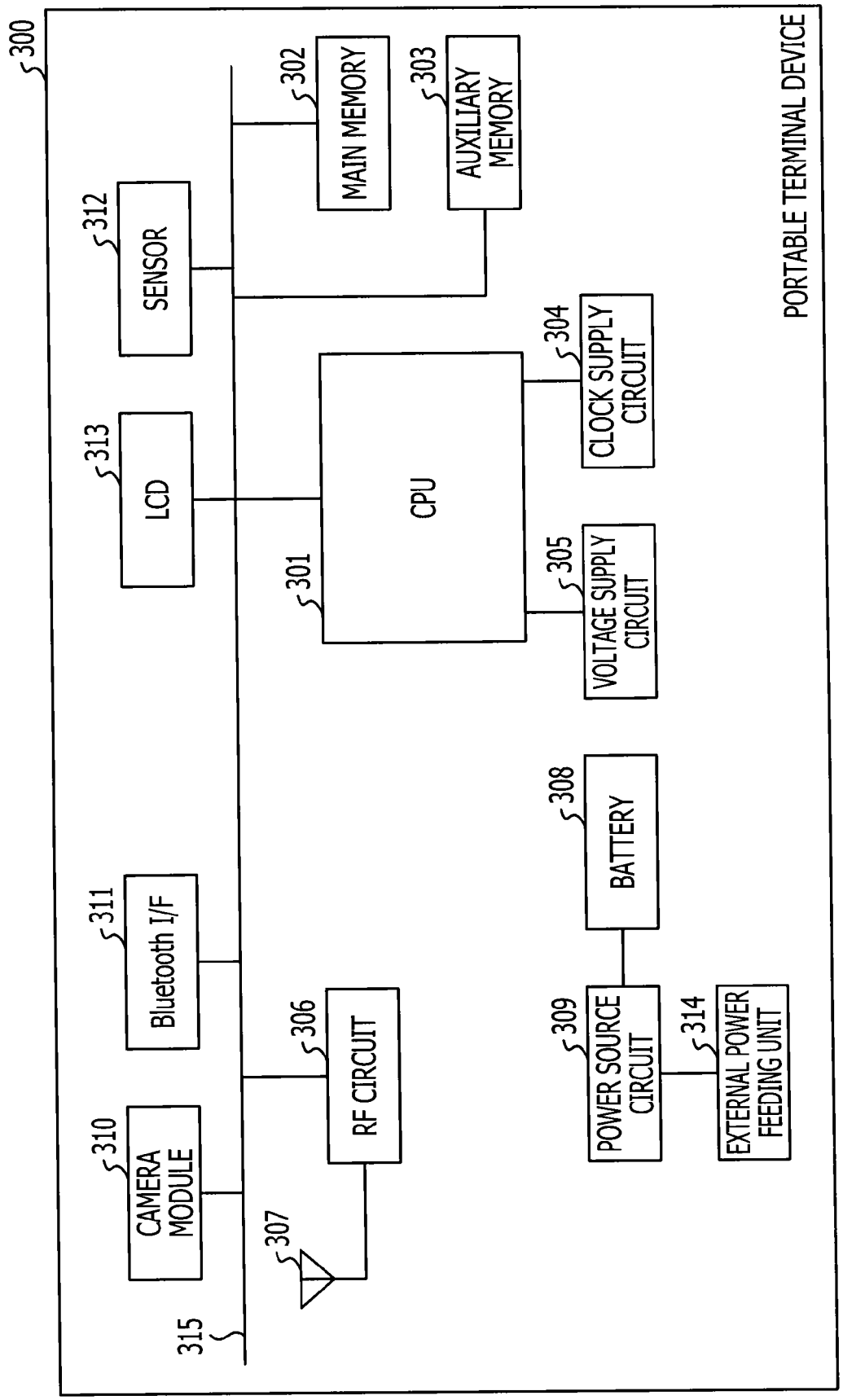
FIG. 4 is a schematic view of the hardware configuration of a portable terminal device according to the first embodiment.

FIG. 4 is a schematic view of the hardware configuration of the portable terminal device 300 according to the first embodiment.

In the embodiment, a smart phone, a tablet personal computer (PC), or the like is envisaged as the portable terminal device 300, for example.

As depicted in FIG. 4, the portable terminal device 300 according to the embodiment includes a CPU 301, a main memory 302, an auxiliary memory 303, a clock supply circuit 304, a voltage supply circuit 305, a radio frequency (RF) circuit 306, an antenna 307, a battery 308, a power supply circuit 309, a camera module 310, a Bluetooth interface (I/F) 311, a sensor (position measurement device) 312, a liquid crystal display (LCD) 313, an external power supply unit 314, and a bus 315.

The CPU 301, the main memory 302, the auxiliary memory 303, the RF circuit 306, the camera module 310, the Bluetooth I/F 311, the sensor 312, and the LCD 313 are mutually connected via the bus 315, for example.

The CPU 301 is operated by a clock signal supplied from the clock supply circuit 304 and voltage supplied from the voltage supply circuit 305, so as to control hardware of the portable terminal device 300. Furthermore, the CPU 301 reads out programs that are stored in the auxiliary memory 303, loads the programs into the main memory 302, and executes the programs that are loaded into the main memory 302 to realize functions. Details of the functions will be described below.

The main memory 302 stores programs that are executed by the CPU 301. Furthermore, the main memory 302 is used as a work area of the CPU 301 and stores data that is used for processing performed by the CPU 301. RAM may be used as the main memory 302, for example.

The auxiliary memory 303 stores programs for operating the portable terminal device 300. Examples of the programs include an application program and a control program that are executed by the portable terminal device 300. A position measurement program according to the embodiment is also stored in the auxiliary memory 303. As the auxiliary memory 303, a hard disk or a non-volatile memory such as flash memory may be used, for example.

The clock supply circuit 304 generates a clock signal that is supplied to the CPU 301. The clock supply circuit 304 may be realized by a crystal oscillator that oscillates a clock signal and a real time clock (RTC), for example.

The voltage supply circuit 305 generates variable voltage that is supplied to the CPU 301, based on power supplied from the power supply circuit 309. The voltage supply circuit 305 may be realized by a voltage detector and a voltage regulator.

The RF circuit 306 is controlled by the CPU 301 and transmits a high frequency signal from the antenna 307 to other radio communication devices. Furthermore, the RF circuit 306 converts a high frequency signal received by the antenna 307 to a baseband signal and then outputs the baseband signal to the CPU 301.

The battery 308 supplies power to the power supply circuit 309. The battery 308 may be realized by a battery such as a lithium ion battery and a battery protection integrated circuit (IC), for example.

The power supply circuit 309 supplies power supplied from the battery 308 to hardware of the portable terminal device 300 via a power source line (not depicted). When an external power source (not depicted) is connected to the external power supply unit 314, the power supply circuit 309 may supply power supplied from the external power supply unit 314 to hardware of the portable terminal device 300. The power supply circuit 309 may be realized by a switching regulator and a voltage regulator, for example.

The camera module 310 is controlled by the CPU 301 and acquires image data of a subject. The Bluetooth I/F 311 is a communication interface for executing radio communication with other radio communication devices via Bluetooth®. The portable terminal device 300 may further include a radio communication interface such as for a wireless local area network (LAN).

The LCD 313 is controlled by the CPU 301 and displays image information for a user. The LCD 313 may include a touch screen as a position input device, for example.

The sensor 312 is controlled by the CPU 301 and acquires state information of the portable terminal device 300. As the sensor 312, an acceleration sensor, a gyro sensor, an illumination sensor, a geomagnetic sensor, a tilt sensor, a pressure sensor, a proximity sensor, a temperature sensor, a 3G module, a wireless LAN module, a GPS module, or the like may be used, for example.

Figure 5:
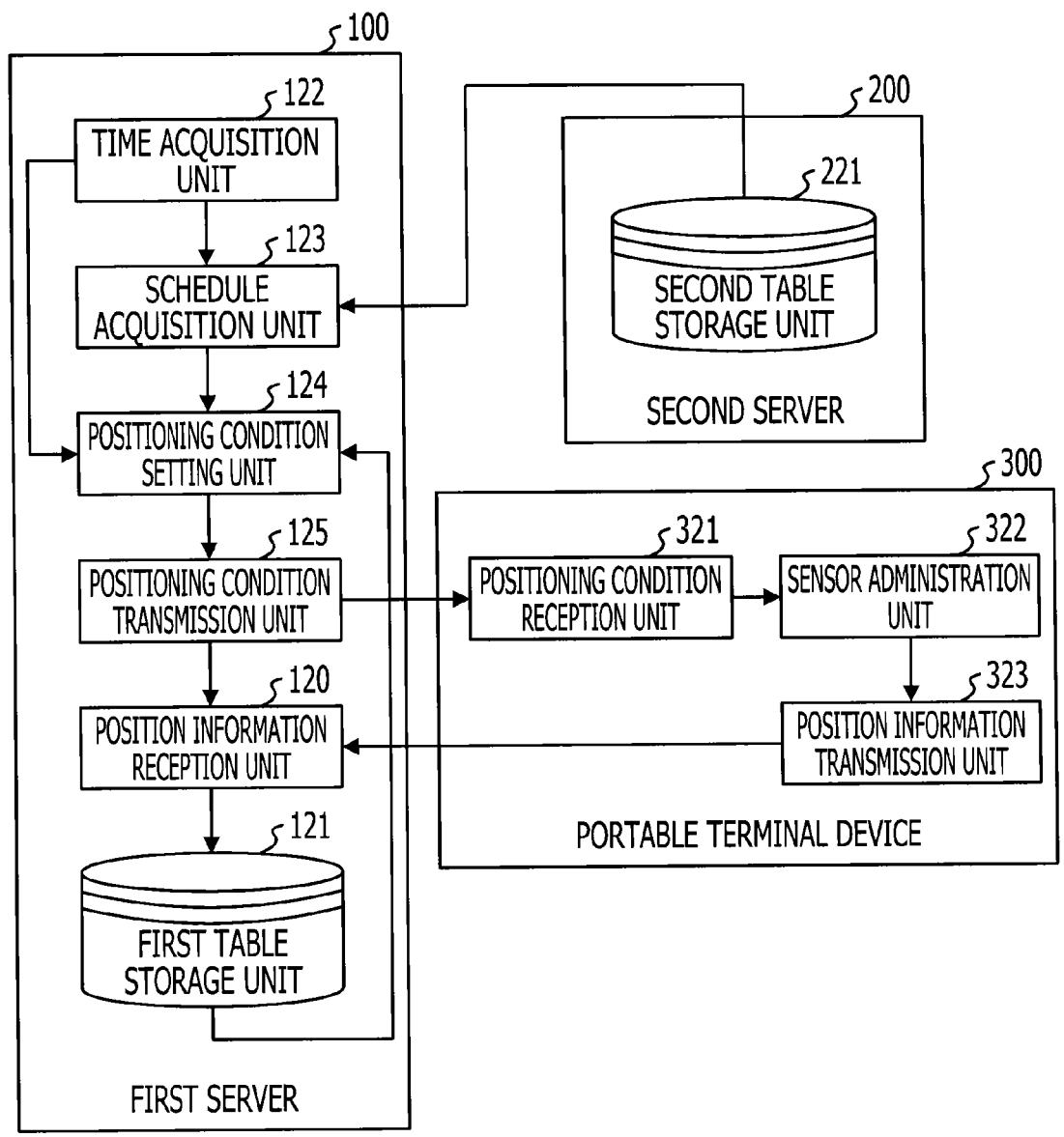
FIG. 5 is a schematic view of a function block of the information processing system according to the first embodiment.

FIG. 5 is a schematic view of a function block of the information processing system according to the first embodiment.

As depicted in FIG. 5, the information processing system according to the embodiment includes the first server 100, the second server 200, and the portable terminal device 300.

(First Server 100)

The first server 100 according to the embodiment includes a position information receiving unit 120, the first table storage unit 121, a time acquiring unit 122, a schedule acquiring unit 123, a position measurement conditions setting unit 124, and a position measurement conditions transmitting unit 125.

All of the position information receiving unit 120, the first table storage unit 121, the time acquiring unit 122, the schedule acquiring unit 123, the position measurement conditions setting unit 124, and the position measurement conditions transmitting unit 125 are realized by executing a position measurement control program, which is loaded into the main storage device 102 by the CPU 101. When the CPU 101 executes the position measurement control program that is loaded into the main storage device 102, the first table storage unit 121 is created in the hard disk 106.

The position information receiving unit 120 receives position information, for the portable terminal device 300, that is transmitted from the position information transmission unit 323 of the portable terminal device 300. Furthermore, the position information receiving unit 120 stores the position information, which is received from the position information transmission unit 323 of the portable terminal device 300, in the first table storage unit 121.

The first table storage unit 121 stores the service provision area information table 500, the user position information table 510, and the position measurement conditions table 520. Details of the service provision area information table 500, the user position information table 510, and the position measurement conditions table 520 will be described below.

The time acquiring unit 122 acquires the current time based on an output from a clock circuit (not depicted), for example.

The schedule acquiring unit 123 acquires schedule information, namely, the schedule table 530 which is associated with a user ID, from the second table storage unit 221 of the second server 200, based on the user ID associated with the portable terminal device 300. Furthermore, the schedule acquiring unit 123 searches the schedule table 530 that is associated with the user ID, based on the current time acquired from the time acquiring unit 122, so as to extract the schedule ID of a scheduled event whose start time is within a given period of time (for example, within 20 minutes). The scheduled event indicates a planned event of a user, in particular, "conference", "presentation", "business meeting" and the like, for example. However, a planned event where the user does not pause in a given position, such as "transfer", is not included.

The position measurement conditions setting unit 124 sets position measurement conditions, namely, a position measurement cycle and position measurement accuracy of the sensor 312 of the portable terminal device 300, based on position information received from the position information transmission unit 323 of the portable terminal device 300 and schedule information acquired from the second table storage unit 221 of the second server 200. Specifically, the position measurement conditions setting unit 124 changes the position measurement cycle or position measurement accuracy of the position measurement conditions table 520, which is described below. Details of the position measurement conditions setting unit 124 will be described below.

Every time a position measurement condition is changed by the position measurement conditions setting unit 124, the position measurement conditions transmitting unit 125 transmits either a position measurement cycle or position measurement accuracy as a position measurement condition to the position measurement conditions receiving unit 321 of the portable terminal device 300. The transmitting method of a position measurement conditions is not especially limited. For example, an IP network may be used for the transmission.

(Second Server 200)

The second server 200 according to the embodiment includes the second table storage unit 221. The second table storage unit 221 is created in the hard disk 206 when the CPU 201 executes the position measurement control program that is loaded into the main storage device 202. The second table storage unit 221 stores the schedule table 530, which is formed for every user. The schedule table 530 is created by an existing scheduler, and information related to a scheduled event (a planned event) of a user is registered in the schedule table 530. Details of the schedule table 530 will be described later.

(Portable Terminal Device 300)

The portable terminal device 300 according to the embodiment includes the position measurement conditions receiving unit 321, a sensor management unit 322, and the position information transmission unit 323. Each of the position measurement conditions receiving unit 321, the sensor management unit 322, and the position information transmission unit 323 are realized by executing the position measurement program, which is loaded into the main memory 302, by using the CPU 301.

The position measurement conditions receiving unit 321 receives position measurement conditions that are transmitted from the position measurement conditions transmitting unit 125 of the first server 100. The position measurement conditions include a position measurement cycle and position measurement accuracy of the sensor 312.

The sensor management unit 322 sets the position measurement cycle and position measurement accuracy of the sensor 312 based on the position measurement conditions received by the position measurement conditions receiving unit 321. Furthermore, the sensor management unit 322 controls position measurement of the sensor 312. The sensor 312 executes position measurement based on the position measurement conditions set by the sensor management unit 322.

The position information transmission unit 323 receives position information, which is acquired by the position measurement of the sensor 312, from the sensor management unit 322 and transmits the position information to the position information receiving unit 120 of the first server 100. The transmitting method of position information is not especially limited. For example, an IP network may be used for the transmission.

(Service Provision Area Information Table 500)

FIG. 6 is a schematic view of the service provision area information table 500 according to the first embodiment.

As depicted in FIG. 6, the service provision area information table 500 according to the embodiment is stored in the first table storage unit 121 of the first server 100. The service provision area information table 500 is a table that associates together a service ID and service provision area information.

A service ID is identification information for identifying a service provided by a service provider. Service provision area information is information about an area in which the service is provided. A service provider is a restaurant or the like, a service is distribution of a discount coupon or the like, and an area is the area surrounding a station, a shop, or the like. For example, when the current position of the portable terminal device 300 is within an area defined by service provision area information, a service identified by a service ID is provided.

A service provision area according to the embodiment may be an approximately rectangular or trapezoidal area whose four vertexes are respectively on four coordinates (X1,Y1), (X2,Y2), (X3,Y3), and (X4,Y4). A combination of longitude and latitude, for example, may be used as vertex coordinates to define a service provision area. For example, when the nearby area of Tokyo station is set as a service provision area, a service provider registers four sets of coordinates, which correspond to vertexes of a rectangular area containing Tokyo station, as service provision area information.

(User Position Information Table 510)

FIG. 7 is a schematic view of the user position information table 510 according to the first embodiment.

As depicted in FIG. 7, the user position information table 510 according to the embodiment is stored in the first table storage unit 121 of the first server 100. The user position information table 510 is a table that associates together a user ID, position information, and position measurement time.

A user ID is identification information for identifying a user to whom a service provider provides a service. Position information is position coordinates of the portable terminal device 300, which is acquired by the first server 100. A combination of longitude and latitude, for example, may be used as position coordinates. Position measurement time is the time when position information of the portable terminal device 300 is acquired by the first server 100.

For example, when a user whose user ID is "1000" is at a position (X1,Y1) at 12:00:00 on Oct. 14, 2011, the user ID "1000", the position information "(X1,Y1)", and the position measurement time "2011.10.14 12:00:00" are associated together and recorded in the user position information table 510, as depicted in FIG. 7.

(Position Measurement Conditions Table 520)

FIG. 8 is a schematic view of the position measurement conditions table 520 according to the first embodiment.

As depicted in FIG. 8, the position measurement conditions table 520 according to the embodiment is stored in the first table storage unit 121 of the first server 100. The position measurement conditions table 520 is a table that associates together a user ID, a position measurement cycle, and position measurement accuracy.

A user ID is information that identifies a user to whom a service provider provides a service. A position measurement cycle is information that indicates the amount of time between successive position measurements performed by the sensor 312. For example, a position measurement cycle may be defined as "3 minutes", "8 minutes", "15 minutes", "stop position measurement", and the like, for example. Position measurement accuracy is information indicating the accuracy of the position measurement by the sensor 312. For example, position measurement accuracy may be defined as "low", "high", or the like.

For example, for a portable terminal device that is owned by a user whose user ID is "1000", when the position measurement cycle and position measurement accuracy of the sensor 312 of the portable terminal device 300 are respectively set as "3 minutes" and "low", the user ID "1000", the position measurement cycle "3 minutes", and the position measurement accuracy "low" are associated together and recorded in the position measurement conditions table 520, as depicted in FIG. 8.

Every time a position measurement condition, that is, a position measurement cycle or position measurement accuracy is changed by the position measurement conditions setting unit 124 of the first server 100, the position measurement conditions table 520 is transmitted to the position measurement conditions receiving unit 321 of the portable terminal device 300 by the position measurement conditions transmitting unit 125 of the first server 100.

(Schedule Table 530)

FIG. 9 is a schematic view of the schedule table 530 according to the first embodiment.

The schedule table 530 according to the embodiment is stored in the second table storage unit 221 of the second server 200. A schedule table 530 is formed for every user ID and is a table that associates together a schedule ID, start time, and end time.

A schedule ID is information that identifies a scheduled event (a planned event) of a user. For a scheduled event (a planned event), a planned event such as "conference", "presentation", and "business meeting" where a user pauses at a given position is assumed. Start time is information that indicates the start time for the user's scheduled event. End time is information that indicates the end time for the user's scheduled event.

For example, when a scheduled event whose schedule ID is "0351" starts at 13:00 on Feb. 10, 2012 and ends at 14:00 on Feb. 10, 2012, the schedule ID "0351", the start time "2012.2.10 13:00", and the end time "2012.2.10 14:00" are associated together and recorded in the schedule table 530, as depicted in FIG. 9.

In the embodiment, the start time and end time of a scheduled event are defined for every schedule ID. However, embodiments of the present disclosure are not limited to this. For example, only the start time of a scheduled event may be defined.

(Detailed Configuration of Position Measurement Conditions Setting Unit 124 of First Server 100)

Figure 10:
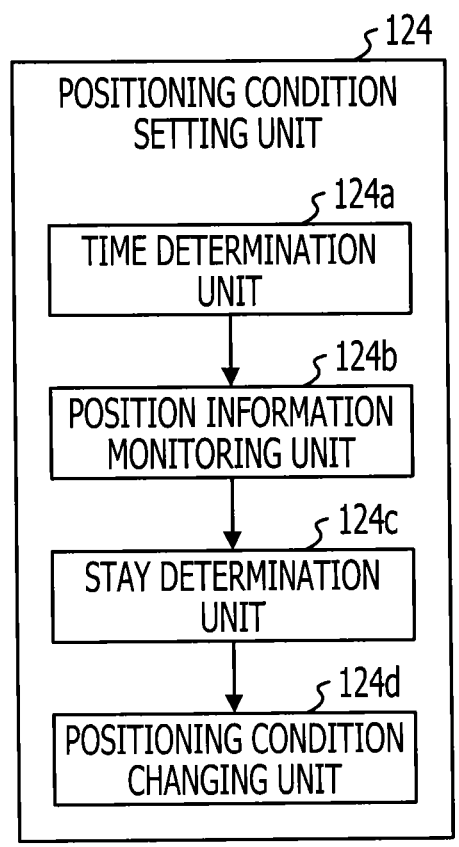
FIG. 10 is a schematic view of a function block of a position measurement conditions setting unit according to the first embodiment.

FIG. 10 is a schematic view of a function block of the position measurement conditions setting unit 124 according to the first embodiment.

As depicted in FIG. 10, the position measurement conditions setting unit 124 of the first server 100 includes a time determination unit 124a, a position information monitoring unit 124b, a pause determination unit 124c, and a position measurement conditions changing unit 124d.

The time determination unit 124a refers to the schedule table 530, which is acquired by the schedule acquiring unit 123, and determines whether there is a scheduled event whose start time comes within a given period of time from current time which is acquired by the time acquiring unit 122. Furthermore, the time determination unit 124a determines whether the current time, which is acquired by the time acquiring unit 122, is after the start time of the scheduled event. Furthermore, the time determination unit 124a determines whether the current time, which is acquired by the time acquiring unit 122, is after the end time of the scheduled event.

The position information monitoring unit 124b refers to the user position information table 510 to determine whether the number of pieces of position information received by the position information receiving unit 120 after the start time of the schedule, that is, the number of pieces of position information that are written in the user position information table 510, is greater than or equal to N pieces (for example, 3 pieces or more), which is predetermined.

When the position information monitoring unit 124b determines that the number of pieces of position information that are written in the user position information table 510 is greater than or equal to the predetermined N pieces, the pause determination unit 124c refers to the user position information table 510 so as to acquire N pieces of latest position information that are associated with the user ID. Furthermore, the pause determination unit 124c refers to the service provision area information table 500 to acquire service provision area information that is associated with the service ID. The pause determination unit 124c determines whether the radius of a minimum circular area that contains all positions corresponding to the N pieces of latest position information that are associated with the user ID is smaller than a predetermined radius R.

When the pause determination unit 124c determines that the radius of the minimum circular area that contains all positions corresponding to the N pieces of latest position information is smaller than the predetermined radius R, the position measurement conditions changing unit 124d changes the position measurement cycle which is recorded in the position measurement conditions table 520, for example, from a position measurement cycle of 3 minutes for normal operations to a position measurement cycle of 15 minutes for pause operations.

Furthermore, when there is a scheduled event whose start time is within a given period of time from the current time that is acquired by the time acquiring unit 122, the position measurement conditions changing unit 124d may change the position measurement accuracy, which is recorded in the position measurement conditions table 520, to position measurement accuracy "high", whose a degree of accuracy is higher than the position measurement accuracy "low" that is used during normal operations.

(Processing Flow of First Server 100)

Figure 11:
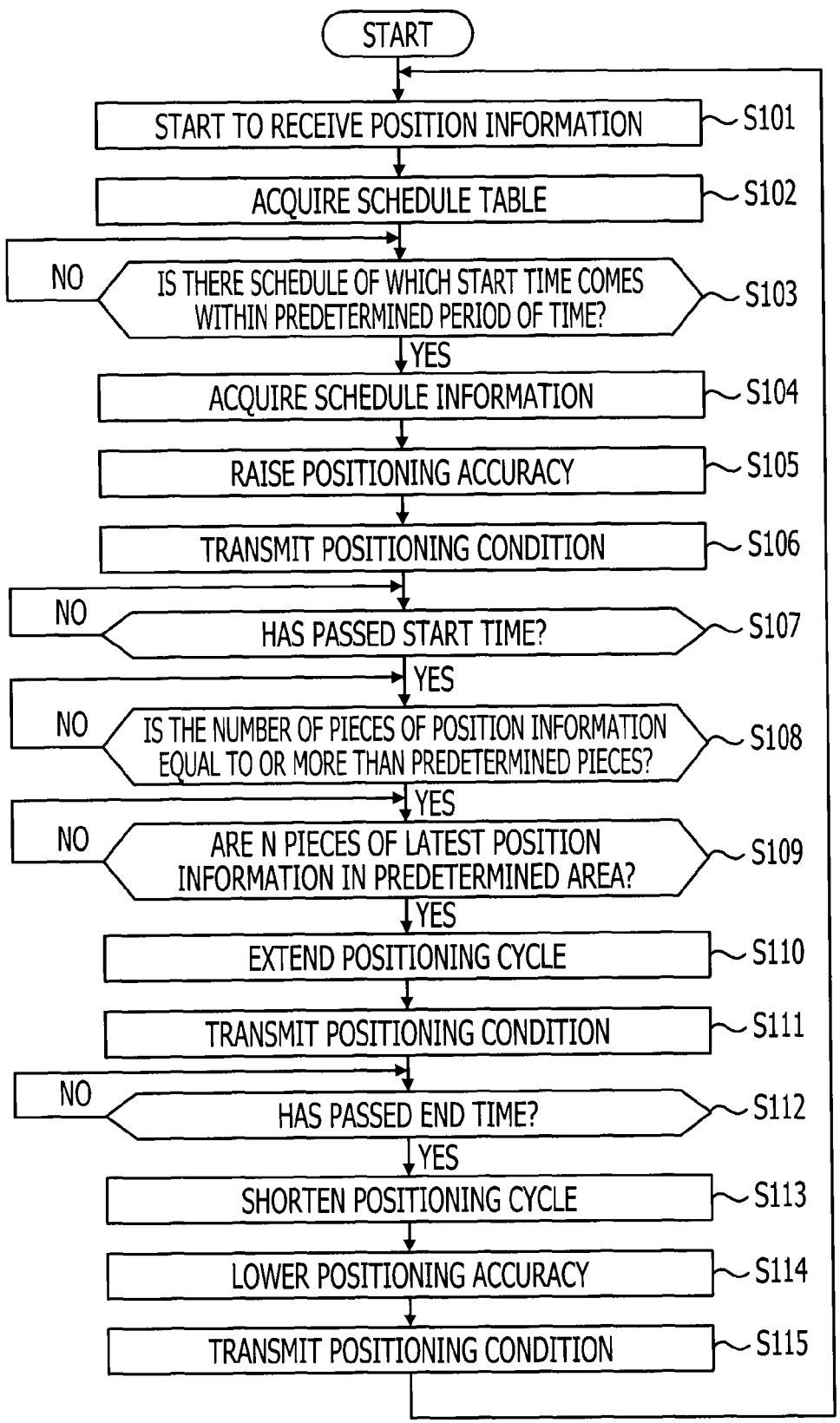
FIG. 11 is a flowchart of processing performed by the first server according to the first embodiment.

FIG. 11 is a flowchart of processing performed by the first server 100 according to the first embodiment.

As depicted in FIG. 11, the position information receiving unit 120 starts to receive position information that is transmitted from the position information transmission unit 323 of the portable terminal device 300 (step S101). At this point, the position measurement cycle of the sensor 312 is set to "3 minutes", which is for normal operations. Therefore, the position information receiving unit 120 receives position information that is transmitted from the position information transmission unit 323 of the portable terminal device 300 every three minutes.

Furthermore, the position information receiving unit 120 stores, in the first table storage unit 121, position information, which is transmitted with acquisition time, in other words position measurement time, added to the position information by the position information transmission unit 323 of the portable terminal device 300. Accordingly, the position information and the position measurement time of the portable terminal device 300 are associated with a user ID and recorded in the user position information table 510.

If a user ID is distributed to the portable terminal device 300, when the portable terminal device 300 adds the user ID to position information and transmits the position information from the position information transmission unit 323, the first server 100 may acquire the user ID of the portable terminal device 300. If a user ID is not distributed to the portable terminal device 300, when, for example, the portable terminal device 300 adds the phone number thereof to position information and transmits the position information from the position information transmission unit 323, the first server 100 may acquire the user ID that is associated with the phone number of the portable terminal device 300. Associating a user ID and a phone number may be performed when the user subscribes to a telephone service.

Next, the schedule acquiring unit 123 searches the second table storage unit 221 of the second server 200 and acquires the schedule table 530 that is associated with the user ID (step S102).

Subsequently, the schedule acquiring unit 123 searches the schedule table 530 that is acquired from the second table storage unit 221 of the second server 200 and determines whether there is a scheduled event whose start time is within a given period of time (for example, within 20 minutes) from the current time that is acquired by the time acquiring unit 122 (step S103).

When it is determined that there is no scheduled event whose start time is within the given period of time (No in step S103), the schedule acquiring unit 123 determines again whether there is a scheduled event whose start time comes within the given period of time from current time (step S103).

However, when it is determined that there is a scheduled event whose start time is within the given period of time (Yes in step S103), the schedule acquiring unit 123 acquires the start time and end time of the scheduled event together with a schedule ID (step S104). At this time, the schedule acquiring unit 123 may determine whether the type of the scheduled event is a planned event where the user pauses at a given position, such as "conference", "presentation", and "business meeting", and execute the following processes only when it is determined that the scheduled event's type is a planned event where the user pauses at a given position.

Next, the position measurement conditions changing unit 124d of the position measurement conditions setting unit 124 may change the position measurement accuracy of the sensor 312 to position measurement accuracy "high" whose a degree of accuracy is higher than the position measurement accuracy "low" for normal operations (step S105). That is, the position measurement conditions changing unit 124d of the position measurement conditions setting unit 124 may overwrite the position measurement accuracy "low", which is recorded in the position measurement conditions table 520, with the position measurement accuracy "high".

When the position measurement accuracy of the sensor 312 is changed to the position measurement accuracy "high", the position measurement conditions transmitting unit 125 transmits the position measurement condition, which is changed by the position measurement conditions changing unit 124d of the position measurement conditions setting unit 124, to the position measurement conditions receiving unit 321 of the portable terminal device 300 (step S106). The portable terminal device 300 allows the sensor 312 to execute position measurement based on the position measurement conditions that are received by the position measurement conditions receiving unit 321. Accordingly, the portable terminal device 300 executes position measurement via the sensor 312 based on the position measurement accuracy "high" whose a degree of accuracy is higher than the position measurement accuracy for normal operations.

Subsequently, the time determination unit 124a of the position measurement conditions setting unit 124 determines whether the current time, which is acquired by the time acquiring unit 122, is after the start time of the scheduled event (step S107).

When it is determined that the current time has not passed the start time of the schedule (No in step S107), the time determination unit 124a of the position measurement conditions setting unit 124 again determines whether the current time that is acquired by the time acquiring unit 122 is after the start time of the schedule (step S107).

However, when it is determined that the current time is after the start time of the schedule (Yes in step S107), the position information monitoring unit 124b of the position measurement conditions setting unit 124 refers to the user position information table 510 so as to determine whether the number of pieces of position information acquired after the start time of the schedule is greater than or equal to predetermined N pieces (for example, 3 pieces or more) (step S108).

When it is determined that the number of pieces of position information acquired after the start time of the scheduled event is not greater than or equal to the given N pieces (No in step S108), the position information monitoring unit 124b of the position measurement conditions setting unit 124 determines whether the number of pieces of position information acquired after the start time of the schedule is greater than or equal to the given N pieces, again (step S108).

However, when it is determined that the number of pieces of position information which are acquired after the start time of the schedule is greater than or equal to the given N pieces (Yes in step S108), the pause determination unit 124c of the position measurement conditions setting unit 124 determines whether the radius of a minimum circular area that contains all positions corresponding to N pieces of latest position information that are recorded in the user position information table 510 is smaller than a given radius R (step S109). Setting details of the circular area will be described later.

When it is determined that the radius of the minimum circular area that contains all positions corresponding to the N pieces of latest position information that are recorded in the user position information table 510 is not smaller than the given radius R (No in step S109), the pause determination unit 124c of the position measurement conditions setting unit 124 determines whether the radius of a minimum circular area that contains all positions corresponding to N pieces of latest position information which are recorded in the user position information table 510 is smaller than a given radius R, again (step S109).

However, when it is determined that the radius of the minimum circular area that contains all positions corresponding to the N pieces of latest position information that are recorded in the user position information table 510 is smaller than the given radius R (Yes in S109), the position measurement conditions changing unit 124d of the position measurement conditions setting unit 124 changes the position measurement cycle of the sensor 312 from the position measurement cycle "3 minutes", for normal operations, to the position measurement cycle "15 minutes" for pause operations (step S110). That is, the position measurement conditions changing unit 124d of the position measurement conditions setting unit 124 overwrites the position measurement cycle "3 minutes", which is recorded in the position measurement conditions table 520, with the position measurement cycle "15 minutes", which is the longer cycle.

In the embodiment, when it is determined that the radius of a minimum circular area that contains all positions corresponding to N pieces of latest position information is smaller than a given radius R, it is judged that a user has already reached the opening place of a scheduled event and is waiting until the event start time of the scheduled event, that is, the user does not leave the opening place of the schedule.

Furthermore, in the embodiment, when the start time of the schedule has passed, it is assumed that the user does not leave the opening place of the schedule for the near term, that is, the user pauses at a given position and the position measurement cycle is extended.

Therefore, the position measurement conditions changing unit 124d of the position measurement conditions setting unit 124 changes the position measurement cycle of the sensor 312 from the position measurement cycle "3 minutes", for normal operations, to the position measurement cycle "15 minutes", for pause operations, as described above. Accordingly, power consumption of the sensor 312 is reduced while the user pauses, contributing to suppression of battery consumption by the portable terminal device 300.

Next, the position measurement conditions transmitting unit 125 transmits the position measurement conditions, which were changed by the position measurement conditions changing unit 124*d* of the position measurement conditions setting unit 124, to the position measurement conditions receiving unit 321 of the portable terminal device 300 (step S111). The portable terminal device 300 allows the sensor 312 to execute position measurement based on the position measurement conditions received by the position measurement conditions receiving unit 321. Thus, the portable terminal device 300 executes position measurement via the sensor 312 based on the position measurement cycle "15 minutes" for pause operations, which is longer cycle than the cycle for normal operations.

Subsequently, the time determination unit 124*a* of the position measurement conditions setting unit 124 determines whether the current time, which is acquired by the time acquiring unit 122, is after the end time of the scheduled event (step S112).

When it is determined that the current time is not after the end time of the scheduled event (No in step S112), the time determination unit 124*a* of the position measurement conditions setting unit 124 again determines whether the current time, which is acquired by the time acquiring unit 122, is after the end time of the scheduled event (step S112).

However, when it is determined that the current time is after the end time of the scheduled event (Yes in step S112), the position measurement conditions changing unit 124*d* of the position measurement conditions setting unit 124 changes the position measurement cycle of the sensor 312 from the position measurement cycle "15 minutes", for pause operations, to the position measurement cycle "3 minutes", for normal operations (step S113). That is, the position measurement conditions changing unit 124*d* of the position measurement conditions setting unit 124 overwrites the position measurement cycle "15 minutes" which is recorded in the position measurement conditions table 520 with the position measurement cycle "3 minutes".

If the position measurement conditions changing unit 124*d* of the position measurement conditions setting unit 124 changes the position measurement accuracy of the sensor 312 to the position measurement accuracy "high" whose a degree of accuracy is higher than the position measurement accuracy "low" for normal operations (step S105), the position measurement conditions changing unit 124*d* of the position measurement conditions setting unit 124 further changes the position measurement accuracy of the sensor 312 from the position measurement accuracy "high" for pause operations to the position measurement accuracy "low" for normal operations (step S114). That is, the position measurement conditions changing unit 124*d* of the position measurement conditions setting unit 124 overwrites the position measurement accuracy "high", which is recorded in the position measurement conditions table 520, with the position measurement accuracy "low".

Then, the position measurement conditions transmitting unit 125 transmits the position measurement conditions, which have been changed by the position measurement conditions changing unit 124*d* of the position measurement conditions setting unit 124, to the position measurement conditions receiving unit 321 of the portable terminal device 300 (step S115). The portable terminal device 300 allows the sensor 312 to execute position measurement based on the position measurement conditions that are received by the position measurement conditions receiving unit 321. Thus, the portable terminal device 300 executes position measurement through the sensor 312 based on the position measurement cycle "3 minutes" and the position measurement accuracy "low", which is for normal operations.

Then, the position information receiving unit 120 again continues to receive position information which is transmitted from the position information transmission unit 323 of the portable terminal device 300 (step S101).

(Processing Flow of Portable Terminal Device 300)

Figure 12:
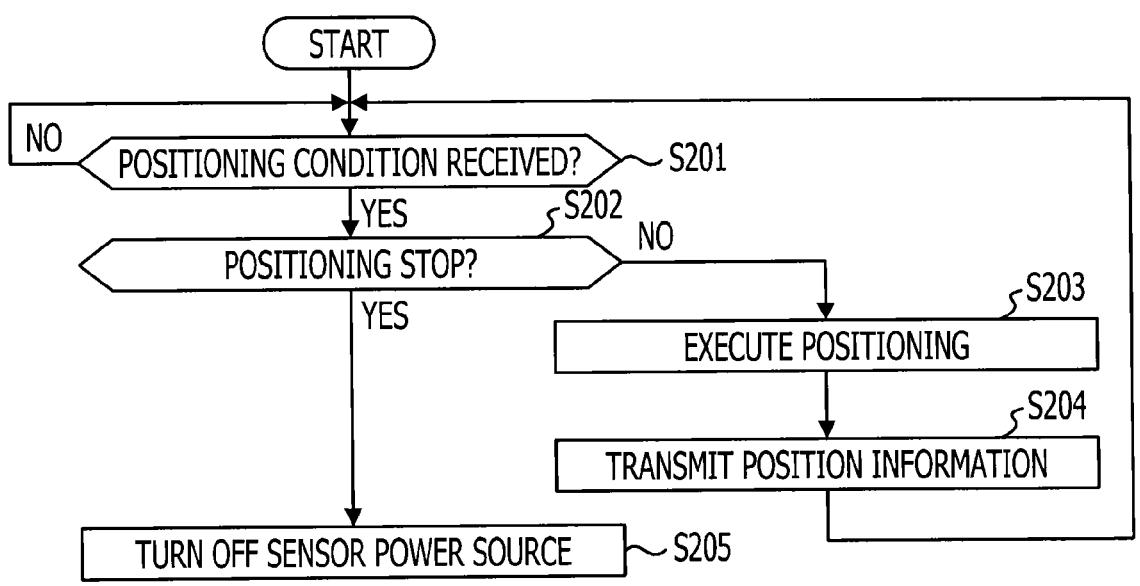
FIG. 12 is a flowchart of processing performed by the portable terminal device according to the first embodiment.

FIG. 12 is a flowchart of processing performed by the portable terminal device 300 according to the first embodiment.

As depicted in FIG. 12, the position measurement conditions receiving unit 321 determines whether the position measurement conditions receiving unit 321 has received position measurement conditions which are transmitted from the position measurement conditions transmitting unit 125 of the first server 100 (step S201).

When it is determined that position measurement conditions have not been received (No in step S201), the position measurement conditions receiving unit 321 determines again whether the position measurement conditions receiving unit 321 has received position measurement conditions which are transmitted from the position measurement conditions transmitting unit 125 of the first server 100 (step S201).

However, when it is determined that position measurement conditions have been received (Yes in step S201), the sensor management unit 322 determines whether the position measurement conditions that have been received by the position measurement conditions receiving unit 321 contain "stop position measurement" (step S202).

When it is determined that the position measurement conditions does not contain "stop position measurement" (No in step S202), the sensor management unit 322 instructs the sensor 312 to execute position measurement based on position measurement conditions that have been received by the position measurement conditions receiving unit 321 (step S203).

Next, the position information transmission unit 323 transmits position information that is acquired through the position measurement of the sensor 312 to the position information receiving unit 120 of the first server 100 (step S204).

Subsequently, the position measurement conditions receiving unit 321 determines again whether the position measurement conditions receiving unit has received position measurement conditions that are transmitted from the position measurement conditions transmitting unit 125 of the first server 100 (step S201).

However, when it is determined that the position measurement conditions contains "stop position measurement" (Yes in step S202), the sensor management unit 332 may turn off the power source of the sensor 312 (step S205). The sensor management unit 332 may select a sensor 312 that is optimal for the position measurement conditions among a plurality of sensors 312 and allow the sensor 312 to execute position measurement, as appropriate.

By executing the above-described flow, the portable terminal device 300 allows the sensor 312 to execute position measurement based on position measurement conditions that are decided by the first server 100.

According to the embodiment, the position measurement conditions setting unit 124 of the first server 100 determines whether a user of the portable terminal device 300 pauses in a small area, based on position information of the portable terminal device 300, which is acquired after the start time of a scheduled event. When it is determined that the user pauses in the small area, the position measurement conditions setting unit 124 of the first server 100 extends the position measurement cycle of the sensor 312 of the portable terminal device 300.

That is, when the user of the portable terminal device 300 pauses in the small area, it may be considered that the user has started the scheduled event as planned. Furthermore, it may be predicted that the user continues to pause in the area until the end time of the scheduled event. In the embodiment, by utilizing the above, the position measurement cycle of the sensor 312 may be extended when it is determined that the user pauses in a small area.

Thus, the position measurement cycle of the sensor 312 of the portable terminal device 300 may be extended by utilizing a user's schedule information, thereby being able to suppress power consumption of the portable terminal device 300 without degrading acquisition accuracy of position information for the portable terminal device 300.

In the embodiment, the radius of a minimum circular area that contains all positions corresponding to N pieces of latest position information is used to determine whether the user pauses or not. However, embodiments of the present disclosure are not limited to this. For example, a single piece of position information may be selected as a reference position from N pieces of latest position information and whether each of all distances from N−1 pieces of position information to the reference position is smaller than a predetermined distance may be determined.

Second Embodiment

A second embodiment is described below with reference to FIGS. 13 to 16. For configurations and processing that are equivalent to those of the first embodiment, description thereof is omitted.

When it is determined that the radius of a minimum circular area, which contains all positions corresponding to N pieces of latest position information that are recorded in the user position information table 510, is smaller than a predetermined radius R, the position measurement conditions changing unit 124d of the position measurement conditions setting unit 124 according to the first embodiment extends the position measurement cycle of the sensor 312 to the position measurement cycle "15 minutes", for pause operations, which is a longer cycle than the position measurement cycle "3 minutes" for normal operations.

However, a position measurement conditions changing unit 724d of a position measurement conditions setting unit 724 according to the second embodiment does not extend the position measurement cycle of the sensor 312 to the position measurement cycle "15 minutes", which is predetermined, but stops the position measurement of the sensor 312.

That is, the position measurement conditions changing unit 724d of the position measurement conditions setting unit 724 overwrites the position measurement cycle that is recorded in the position measurement conditions table 520 with "stop position measurement" (position measurement cycle "∞"). Therefore, in order to allow the sensor 312 to newly execute position measurement after the position measurement of the sensor 312 is stopped, it is desirable for the position measurement conditions transmitting unit 125 to notify the portable terminal device 300 of an instruction to start position measurement.

(Function Block of Position Measurement Conditions Setting Unit 724)

Figure 13:
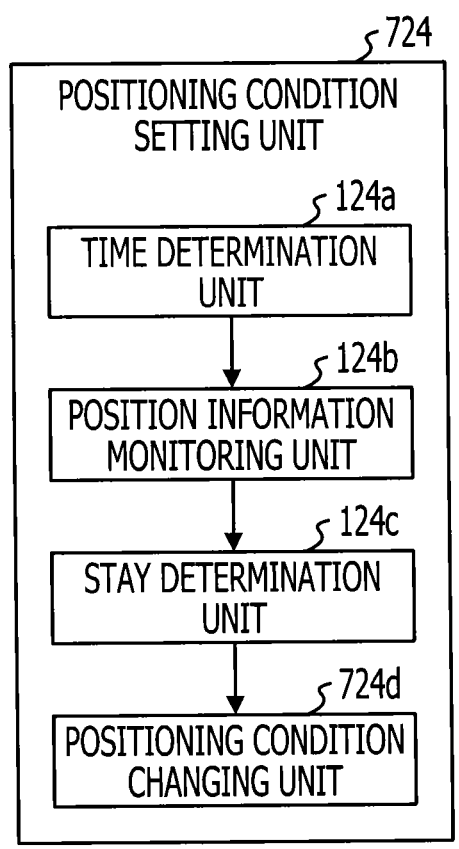
FIG. 13 is a schematic view of a function block of a position measurement conditions setting unit according to a second embodiment.

FIG. 13 is a schematic view of a function block of the position measurement conditions setting unit 724 according to the second embodiment.

As depicted in FIG. 13, the position measurement conditions setting unit 724 according to the second embodiment includes the position measurement conditions changing unit 724d instead of the position measurement conditions changing unit 124d according to the first embodiment. The position measurement conditions changing unit 724d of the position measurement conditions setting unit 724 decides the next position measurement time based on the following formula 1. The next position measurement time is when position measurement is first executed after the position measurement of the sensor 312 is stopped.

Next position measurement time=current time+(end time−current time)/2 (formula 1)

Figure 14:
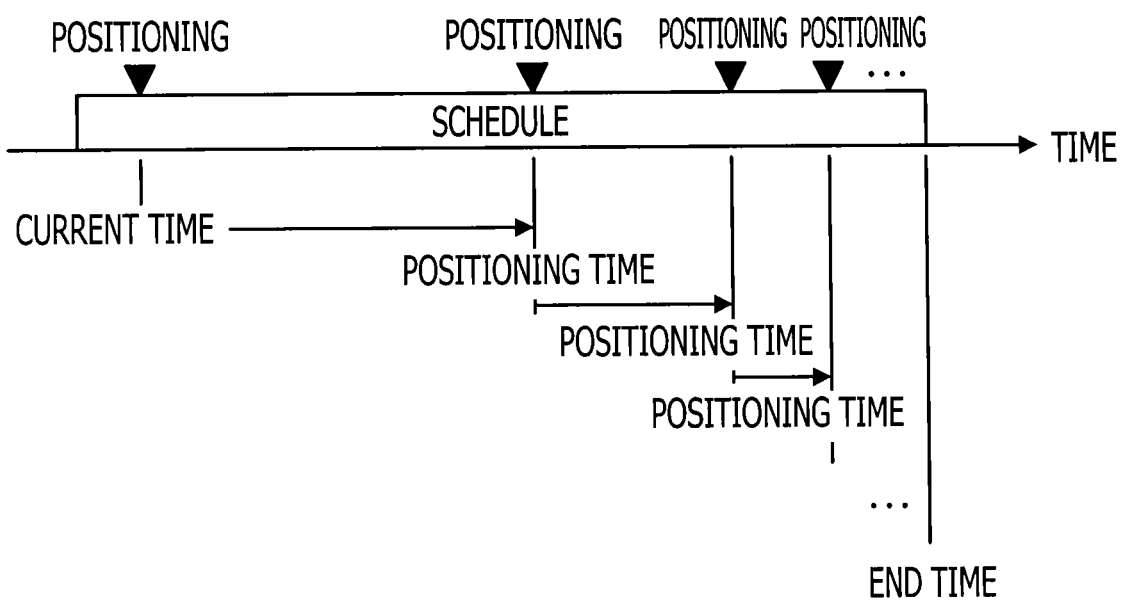
FIG. 14 is a schematic view illustrating next position measurement time, which is set by a position measurement conditions changing unit of the position measurement conditions setting unit according to the second embodiment.

FIG. 14 is a schematic view of next position measurement time which is set by the position measurement conditions changing unit 724d of the position measurement conditions setting unit 724 according to the second embodiment.

As depicted in FIG. 14, the above formula means that time corresponding to half of the amount of time from the current time, which is a reference time, to the end time of a scheduled event (scheduled event remaining time) is set as the next position measurement time. Accordingly, the position measurement cycle of the sensor 312 becomes shorter toward the end time of the schedule.

(Position Measurement Conditions Table 540)

FIG. 15 is a schematic view of a position measurement information table 540 according to the second embodiment.

As depicted in FIG. 15, the position measurement information table 540 according to the embodiment associates the next position measurement time with the user ID of the position measurement information table 520 according to the first embodiment.

For example, when the next position measurement time of the sensor 312 of the portable terminal device 300, which is owned by a user whose a user ID is "1000", is 12:30:00, the next position measurement time "12:30:00" is associated with the user ID "1000" and recorded in the position measurement conditions table 540, as depicted in FIG. 15.

(Processing Flow of Position measurement conditions Changing Unit 724d of Position measurement conditions Setting Unit 724)

Figure 16:
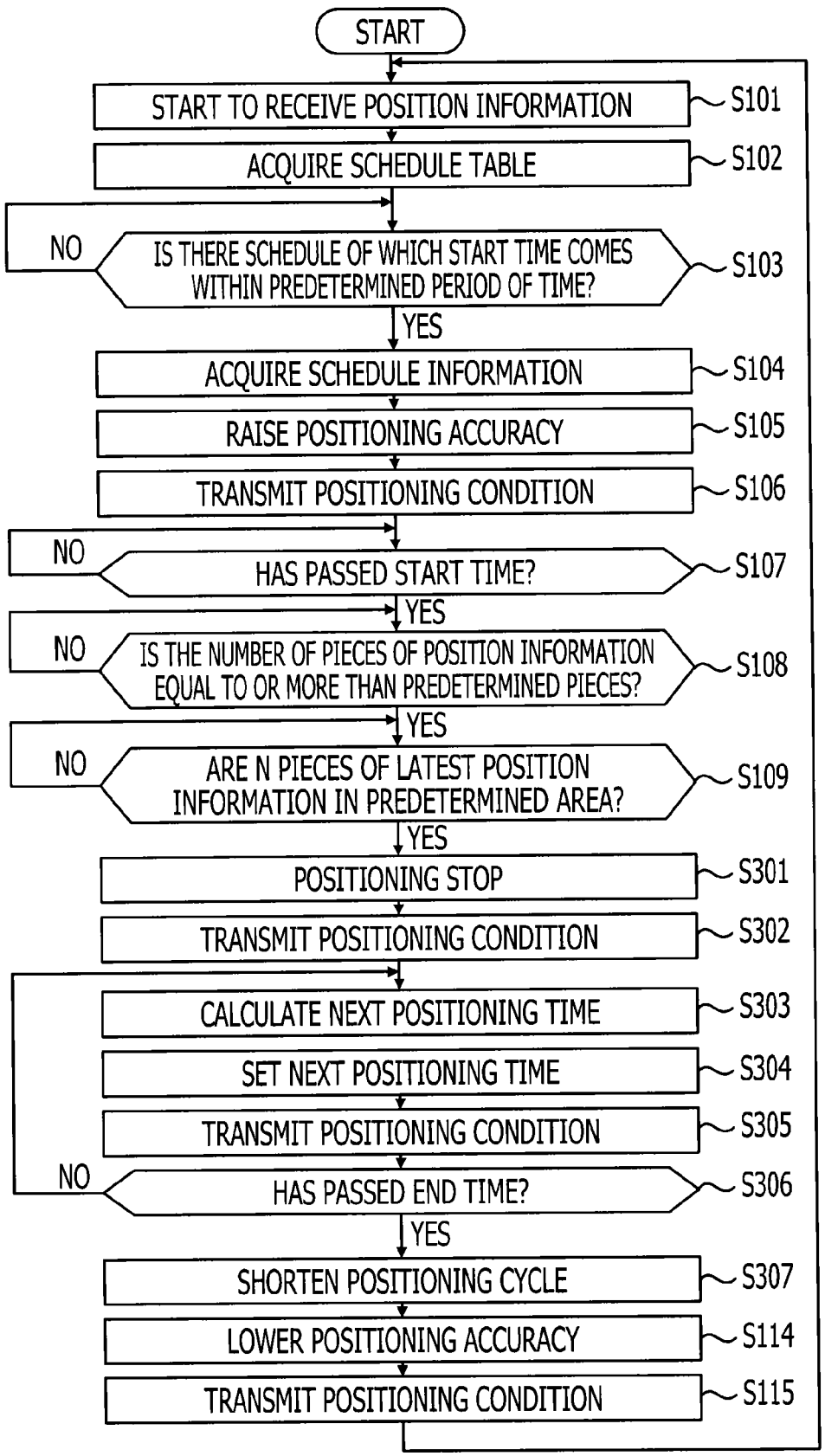
FIG. 16 is a flowchart of processing performed by the position measurement conditions changing unit of the position measurement conditions setting unit according to the second embodiment.

FIG. 16 is a flowchart of processing performed by the position measurement conditions changing unit 724d of the position measurement conditions setting unit 724 according to the second embodiment. Processing different from that of the first embodiment is depicted with a heavy line.

As depicted in FIG. 16, when it is determined that the radius of a minimum circular area, which contains all positions corresponding to N pieces of latest position information that are recorded in the user position information table 510, is smaller than a given radius R (Yes in step S109), the position measurement conditions changing unit 724d of the position measurement conditions setting unit 724 changes the position measurement cycle of the sensor 312 to "stop position measurement" (step S301). That is, the position measurement conditions changing unit 724d of the position measurement conditions setting unit 724 overwrites the position measurement cycle "3 minutes" that is recorded in the position measurement conditions table 540 with the position measurement cycle "stop position measurement".

Then, the position measurement conditions transmitting unit 125 transmits the position measurement conditions, which are changed by the position measurement conditions changing unit 724d of the position measurement conditions setting unit 724, to the position measurement conditions receiving unit 321 of the portable terminal device 300 (step S302). The portable terminal device 300 allows the sensor 312 to execute position measurement based on the position measurement conditions that are received by the position measurement conditions receiving unit 321. Thus, the portable terminal device 300 stops the position measurement performed by the sensor 312 based on the position measurement cycle "stop position measurement".

Subsequently, the position measurement conditions changing unit 724d of the position measurement conditions setting unit 724 substitutes the current time, which is acquired from the time acquiring unit 122, as well as the end time of the scheduled event, which is acquired from the schedule acquiring unit 123, into formula 1 so as to calculate the next position measurement time (step S303).

Then, the position measurement conditions changing unit 724d of the position measurement conditions setting unit 724 sets the next position measurement time, as calculated by using formula 1, as the position measurement time for the sensor 312 (step S304). That is, the position measurement conditions changing unit 724d of the position measurement conditions setting unit 724 writes the next position measurement time, which is calculated by using formula 1, as the next position measurement time recorded in the position measurement conditions table 540.

Subsequently, the position measurement conditions transmitting unit 125 transmits the position measurement conditions, which are set by the position measurement conditions changing unit 724d of the position measurement conditions setting unit 724, to the position measurement conditions receiving unit 321 of the portable terminal device 300 (step S305). The portable terminal device 300 allows the sensor 312 to execute position measurement based on the position measurement conditions received by the position measurement conditions receiving unit 321. Thus, the portable terminal device 300 allows the sensor 312 to execute position measurement at the next position measurement time which is designated by the first server 100.

Then, a time determination unit 724a of the position measurement conditions setting unit 724 determines whether the current time, which is acquired by the time acquiring unit 122, is after the end time of the scheduled event (step S306).

When it is determined that the current time is not after the end time of the schedule (No in step S306), the position measurement conditions changing unit 724d of the position measurement conditions setting unit 724 substitutes the current time, which is acquired from the time acquiring unit 122, and the end time of the scheduled event, which is acquired from the schedule acquiring unit 123, into formula 1 so as to again calculate the next position measurement time (step S303).

However, when it is determined that the current time is after the end time of the scheduled event (Yes in step S306), the position measurement conditions changing unit 724d of the position measurement conditions setting unit 724 changes the position measurement cycle of the sensor 312 to the position measurement cycle "3 minutes", which is for normal operations (step S307). That is, the position measurement conditions changing unit 724d of the position measurement conditions setting unit 724 deletes the next position measurement time that is recorded in the position measurement conditions table 540 and overwrites the position measurement cycle recorded in the position measurement conditions table 540 from the position measurement cycle "stop position measurement" to the position measurement cycle "3 minutes".

According to the embodiment, when it is determined that a user pauses after the start time of a scheduled event, the position measurement cycle of the sensor 312 is not extended but position measurement by the sensor 312 is stopped. Furthermore, after the position measurement by the sensor 312 is stopped, the sensor 312 is allowed to execute position measurement on an occasional basis based on next position measurement time which is calculated from remaining time of the scheduled event. Furthermore, the next position measurement time is calculated so that an effective position measurement cycle is shorter toward the end time of the scheduled event.

Therefore, even if the schedule is finishes earlier than planned and the user leaves the place where the scheduled event was held before the end time of the scheduled event, actual position information of the user may be accurately acquired.

Third Embodiment

A third embodiment is described below with reference to FIGS. 17 and 18. However, for configurations and processing that are equivalent to those of the first embodiment, description thereof is omitted.

When it is determined that there is a scheduled event whose start time is within a given period of time, the position measurement conditions setting unit 124 according to the first embodiment changes the position measurement conditions of the sensor 312 by using the position measurement conditions changing unit 124d.

However, a position measurement conditions setting unit 824 according to the third embodiment changes the position measurement conditions of the sensor 312 by using the position measurement conditions setting unit 124 only when it is determined that there is a scheduled event whose start time is within a predetermined period of time and furthermore, when it is determined that a period of time during which the scheduled event is held (described later) exceeds a predetermined event start time.

(Function Block of First Server 100)

Figure 17:
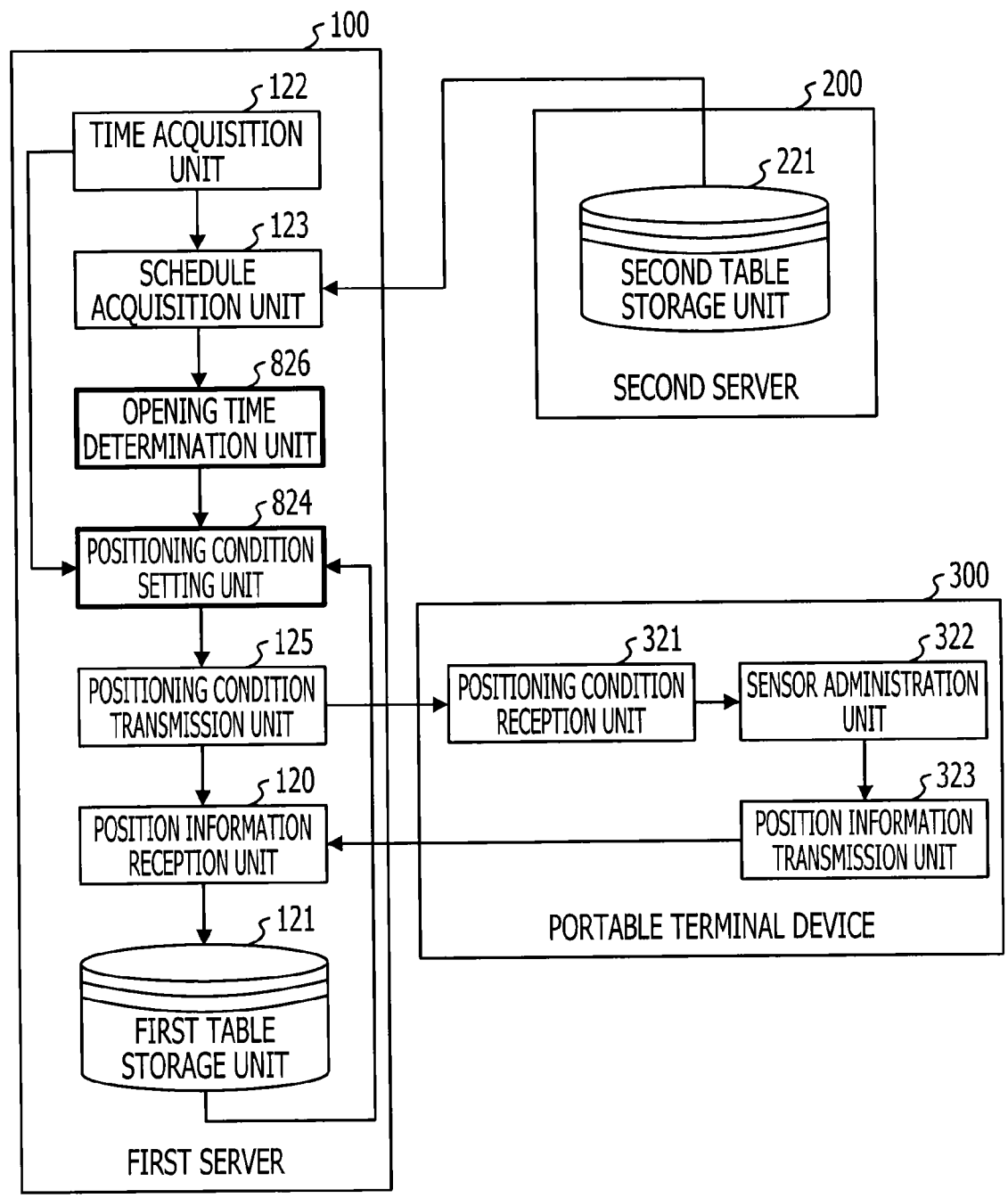
FIG. 17 is a schematic view of a function block of a first server according to a third embodiment.

FIG. 17 is a schematic view of a function block of the first server 100 according to the third embodiment.

As depicted in FIG. 17, the first server 100 according to the third embodiment further includes an event time determination unit 826. The event time determination unit 826 is realized by having the CPU 101 execute an event start time determination program, which is loaded into the main storage device 102. Furthermore, the first server 100 according to the third embodiment includes the position measurement conditions setting unit 824 instead of the position measurement conditions setting unit 124 according to the first embodiment.

The event time determination unit 826 determines whether the period of time from the start time to the end time of a scheduled event, which is acquired by the schedule acquiring unit 123, that is, the length of the event, exceeds the predetermined length of the event.

When the event time determination unit 826 determines that the length of the scheduled event exceeds the predetermined period of length of the event, the position measurement conditions setting unit 824 executes processing to set position measurement conditions of the sensor 312. However, when the event time determination unit 826 determines that the length of the scheduled event does not exceed the predetermined period of length of the event, the position measurement conditions setting unit 824 does not execute processing to set position measurement conditions of the sensor 312.

(Processing Flow of First Server 100)

Figure 18:
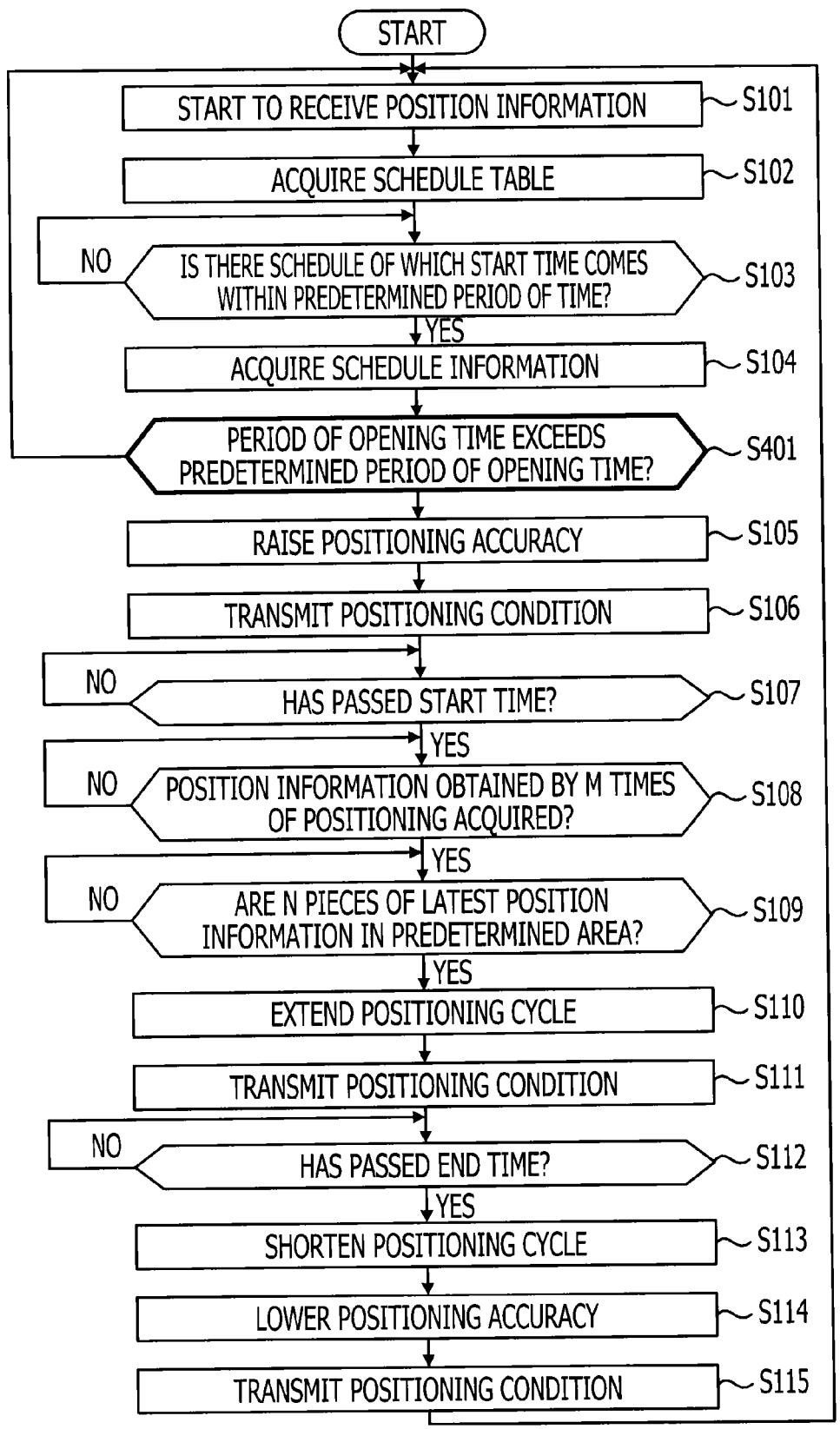
FIG. 18 is a flowchart of processing performed by the first server according to the third embodiment.

FIG. 18 is a flowchart of processing performed by the first server 100 according to the third embodiment. Processing different from that of the first embodiment is depicted by a heavy line.

As depicted in FIG. 18, when the schedule acquiring unit 123 acquires the start time and end time of a scheduled event, whose the start time is within a given period of time (for example, within 20 minutes) from the current time, along with a schedule ID (step S104), the event time determination unit 826 determines whether the length of the scheduled event exceeds the predetermined length of the event, based on the start time and end time of the scheduled event (step S401).

When the event time determination unit 826 determines that the length of a scheduled event does not exceed the predetermined length of the event (No in step S401), the position information receiving unit 120 continues to receive position information which is transmitted from the position information transmission unit 323 of the portable terminal device 300, again (step S101).

However, when the event time determination unit 826 determines that the length of the scheduled event exceeds the predetermined length of the event (Yes in step S401), the position measurement conditions setting unit 824 may change the position measurement accuracy of the sensor 312 to position measurement accuracy "high", whose a degree of accuracy is higher than position measurement accuracy "low", which is for normal operations (step S105).

According to the embodiment, the position measurement conditions setting unit 824 changes the position measurement cycle of the sensor 312, only when the event time determination unit 826 determines that the length of a scheduled event exceeds the predetermined length of the event.

Therefore, changing the setting of the position measurement cycle of the sensor 312 is omitted when, due to the length of a scheduled event being short, it is hard to obtain an advantageous effect out of reducing power consumption of the portable terminal device 300, even if the position measurement cycle of the sensor 312 is extended. Conversely, the load of the first server 100 may be reduced by changing the settings of the position measurement cycle of the sensor 312 only when the length of a scheduled event is long and it is easy to obtain an advantageous effect out of reducing power consumption of the portable terminal device 300 when the position measurement cycle of the sensor 312 has been extended.

Fourth Embodiment

A fourth embodiment is described with reference to FIGS. 19 and 20. However, for configurations and processing that are equivalent to those of the first embodiment, description thereof is omitted.

When it is determined that the current time is after the end time of a scheduled event, the position measurement conditions setting unit 124 according to the first embodiment changes the position measurement cycle of the sensor 312 from the position measurement cycle "15 minutes", which is for pause operations, to the position measurement cycle "3 minutes", which is for normal operations.

However, a position measurement conditions setting unit 924 according to the fourth embodiment changes the position measurement cycle of the sensor 312 from the position measurement cycle "15 minutes" for pause operations to the position measurement cycle "3 minutes" for normal operations, not depending on whether the end time of a scheduled event has passed, but when a user has left an event area (described later).

(Function Block of Position Measurement Conditions Setting Unit 924)

Figure 19:
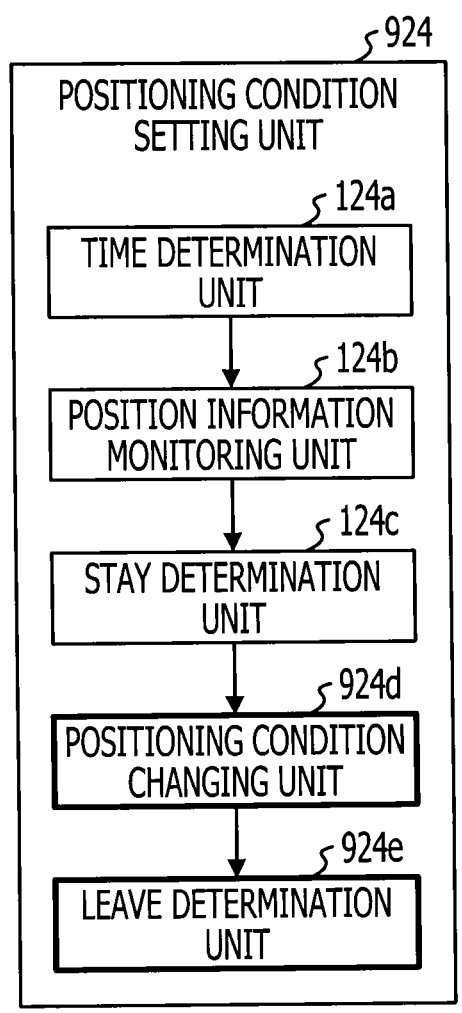
FIG. 19 is a schematic view of a function block of a position measurement conditions setting unit according to a fourth embodiment.

FIG. 19 is a schematic view of a function block of the position measurement conditions setting unit 924 according to the fourth embodiment.

As depicted in FIG. 19, the position measurement conditions setting unit 924 according to the embodiment includes a position measurement conditions changing unit 924d instead of the position measurement conditions changing unit 124d according to the first embodiment, and further includes a leave determination unit 924e.

The leave determination unit 924e according to the embodiment refers to the user position information table 510 to determine whether a position corresponding to position information of a user is outside an event area. The event area is an area containing the place where a scheduled event is held. In other words, the leave determination unit 924e determines whether the user has left the place where the scheduled event is held.

The setting method for an event area is not especially limited. For example, N pieces of latest position information that are recorded in the user position information table 510 may be acquired so as to set a union of circular regions, whose centers are positions corresponding to respective position information, as an event area.

When the leave determination unit 924e determines that a user has left the event area, the position measurement conditions changing unit 924d according to the embodiment considers that the schedule has ended and changes the position measurement cycle that is recorded in the position measurement conditions table 520 from the position measurement cycle "15 minutes" for pause operations to "3 minutes" for normal operations.

(Processing Flow of First Server 100)

Figure 20:
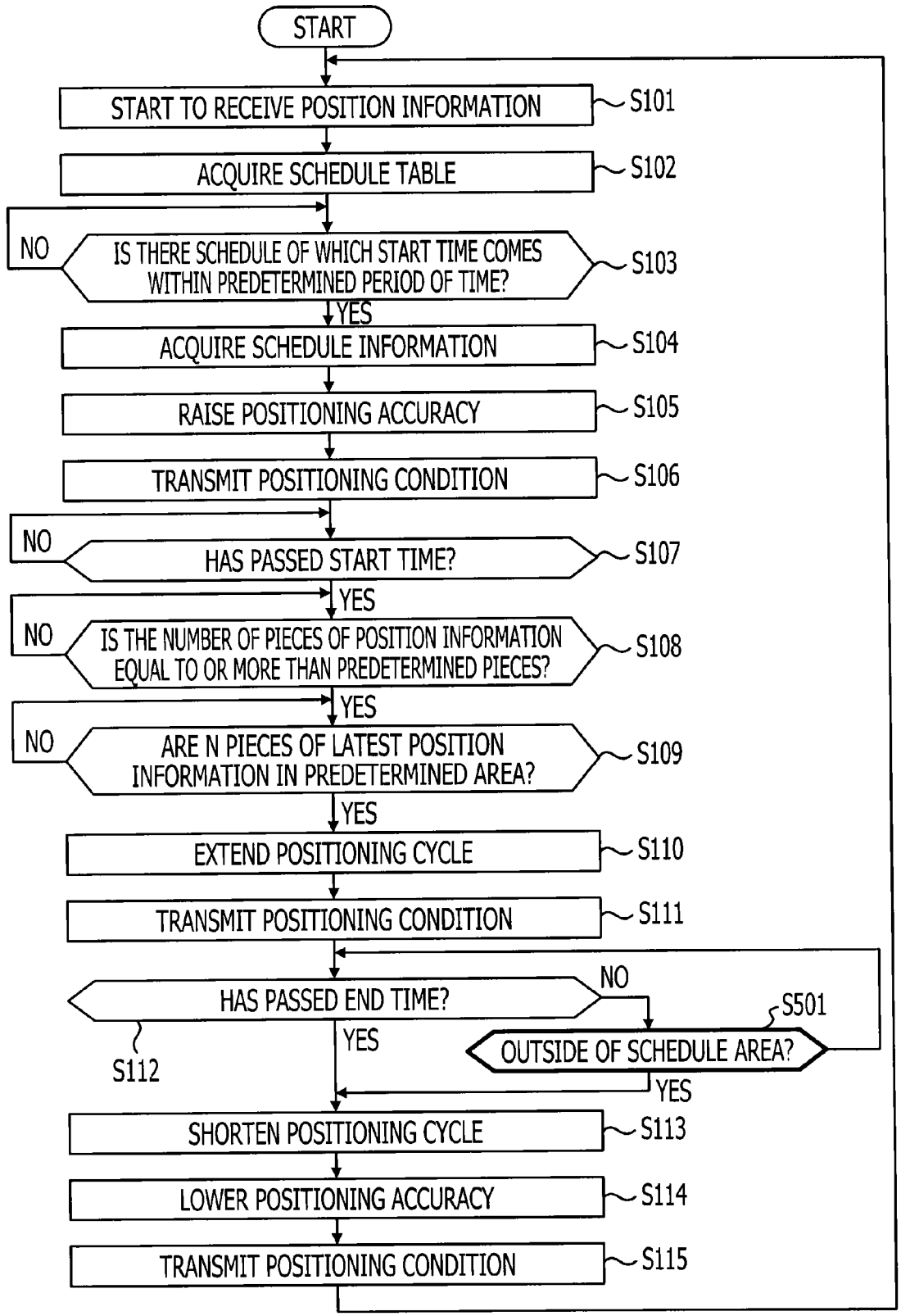
FIG. 20 is a flowchart of processing performed by a first server according to the fourth embodiment.

FIG. 20 is a flowchart of processing performed by the first server 100 according to the fourth embodiment. Processing different from that of the first embodiment is depicted by a heavy line.

As depicted in FIG. 20, when the time determination unit 124a of the position measurement conditions setting unit 924 determines that the current time that is acquired by the time acquiring unit 122 is not after the end time of a scheduled event (No in step S112), the leave determination unit 924e of the position measurement conditions setting unit 924 refers to the user position information table 510 so as to determine whether position information of a user is outside an event area (step S501).

When it is determined that the position information of the user is not outside the event area (No in step S501), the time determination unit 124a of the position measurement conditions setting unit 924 determines again whether the current time that is acquired by the time acquiring unit 122 is after the end time of the schedule (step S112).

However, when it is determined that the position information of the user is outside the event area (Yes in step S501), the position measurement conditions changing unit 924d of the position measurement conditions setting unit 924 considers that the scheduled event has ended and changes the position measurement cycle of the sensor 312 from the position measurement cycle "15 minutes" for pause operations to the position measurement cycle "3 minutes" for normal operations (step S113). That is, the position measurement conditions changing unit 924d of the position measurement conditions setting unit 924 overwrites the position measurement cycle "15 minutes", which is recorded in the position measurement conditions table 520, with the position measurement cycle "3 minutes".

According to the embodiment, when it is determined that a user has left an event area, the position measurement cycle of the portable terminal device 300 is changed from the position measurement cycle "15 minutes" for pause operations to the position measurement cycle "3 minutes" for normal operations regardless of whether the end time of the schedule has passed.

Therefore, even if the schedule ends earlier than planned and the user leaves an opening place of the schedule before the end time of the scheduled event, the position measurement conditions of the sensor 312 may be changed in accordance with the actual movement of the user. Furthermore, even when the end time of a scheduled event is not recorded in schedule information, the position measurement conditions of the sensor 312 may be set in accordance with the movement of the user. As a result, actual position information for the user may be accurately acquired.

Fifth Embodiment

A fifth embodiment is described below with reference to FIGS. 21 to 23. However, for configurations and processing that are equivalent to those of the fourth embodiment, description thereof is omitted.

When it is determined that a user has left an event area, the position measurement conditions setting unit 924 according to the fourth embodiment changes position measurement conditions of the sensor 312 that is mounted on the portable terminal device 300 of the user.

However, a position measurement conditions setting unit 1024 according to the fifth embodiment also changes a position measurement conditions for a sensor that is installed in a portable terminal device (not depicted) of a co-participant (third party) who also participates in the scheduled event, when it is determined that a user has left the event area.

(Schedule Table 550)

FIG. 21 is a schematic view of a schedule table 550 according to the fifth embodiment.

As depicted in FIG. 21, in the schedule table 550 according to the fifth embodiment, co-participant information is further associated with a schedule ID of the schedule table 530 according to the first embodiment. The co-participant information is identification information that identifies a co-participant (third party) who participates together in a scheduled event of a user. In the embodiment, it is assumed that the co-participant has subscribed to the same service as that of the user. Therefore, in the schedule table 530 according to the embodiment, a user ID is recorded as co-participant information.

(Function Block of Position measurement conditions Setting Unit 1024)

Figure 22:
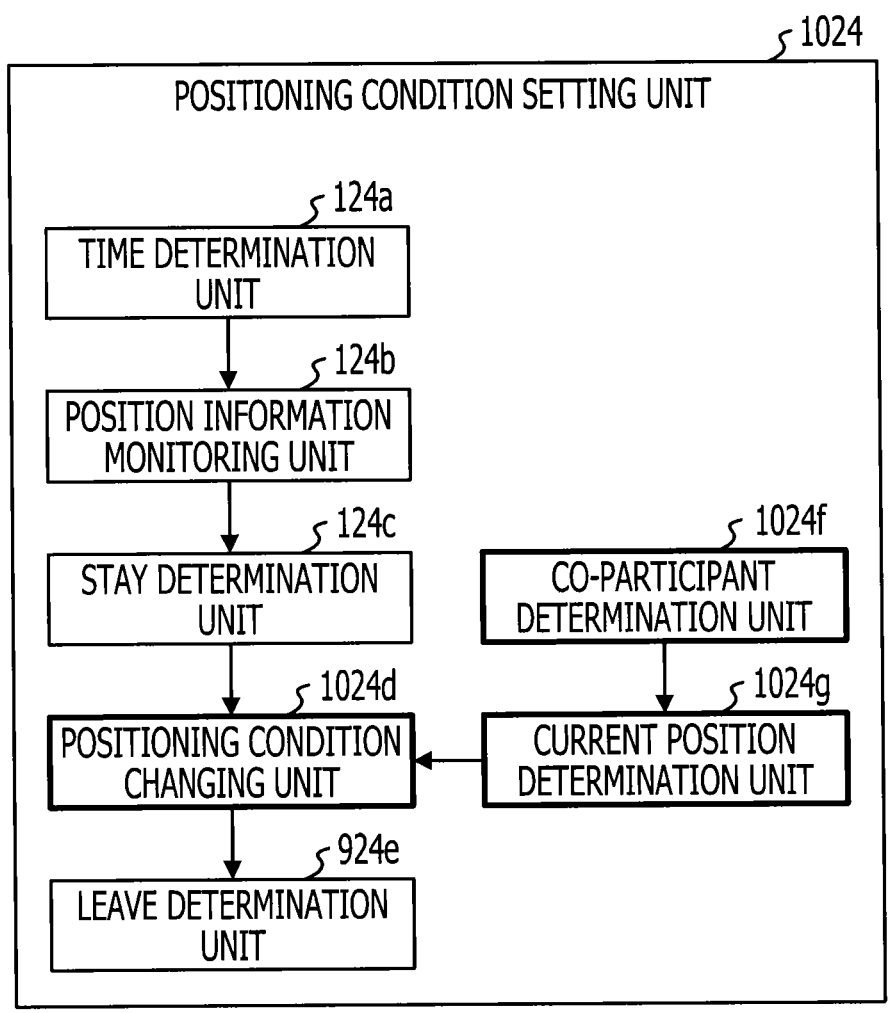
FIG. 22 is a schematic view of a function block of a position measurement conditions setting unit according to the fifth embodiment.

FIG. 22 is a schematic view of a function block of the position measurement conditions setting unit 1024 according to the fifth embodiment.

As depicted in FIG. 22, a co-participant determination unit 1024f searches the schedule table 550, which is acquired by the schedule acquiring unit 123, to determine whether co-participant information that is associated with a schedule ID, that is, a user ID of a co-participant, is recorded.

When the co-participant determination unit 1024f determines that the user ID of a co-participant that is associated with the schedule ID is recorded, a current position determination unit 1024g searches the user position information table 510 so as to acquire the latest position information of the co-participant, that is, the current position of the co-participant, and determines whether the current position of the co-participant is within the event area. When user IDs of a plurality of co-participants are associated with a schedule ID, whether the current position of each of the co-participants is within the event area may be determined.

When the leave determination unit 924e determines that the user has left the event area, the position measurement conditions changing unit 1024d considers that the scheduled event has ended and changes the position measurement cycle of the sensor 312, which is mounted on the portable terminal device 300 of the user, from the position measurement cycle "15 minutes" for pause operations to the position measurement cycle "3 minutes" for normal operations. That is, the position measurement conditions changing unit 1024d overwrites the position measurement cycle, which is associated with the user ID and is recorded in the position measurement conditions table 520, from the position measurement cycle "15 minutes" to the position measurement cycle "3 minutes".

Furthermore, when the current position determination unit 1024g determines that the current position of the co-participant is within the event area, the position measurement conditions changing unit 1024d changes the position measurement cycle of the sensor, which is installed in the portable terminal device (not depicted) of the co-participant of the scheduled event, from the position measurement cycle "15 minutes" for pause operations to the position measurement cycle "3 minutes" for normal operations. That is, the position measurement conditions changing unit 1024d overwrites the position measurement cycle, which is associated with a user ID of the co-participant (third party) and is recorded in the position measurement conditions table 520, from the position measurement cycle "15 minutes" to the position measurement cycle "3 minutes".

(Processing Flow by First Server 100)

Figure 23A:
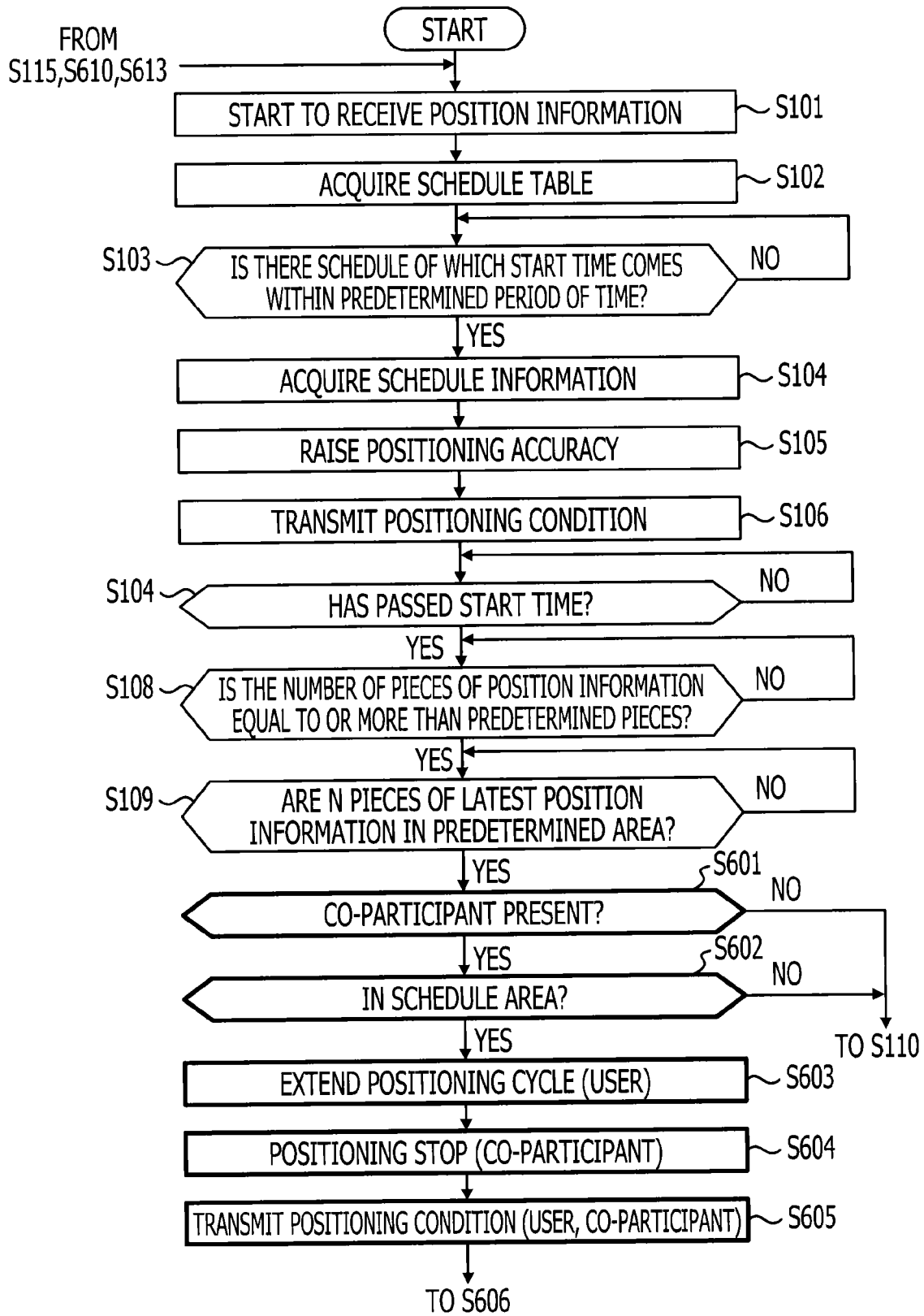

FIGS. 23A and 23B are a flowchart of processing performed by the first server 100 according to the fifth embodiment. Processing different from that of the fourth embodiment is depicted by a heavy line.

As depicted in FIG. 23A or 23B, when it is determined that the radius of a minimum circular area, which contains all positions corresponding to N pieces of latest position information that are recorded in the user position information table 510, is smaller than a given radius R (Yes in step S109), the co-participant determination unit 1024f searches the schedule table 550, which is acquired by the schedule acquiring unit 123, to determine whether co-participant information that is associated with a schedule ID, namely, the user ID of the co-participant is recorded (step S601).

When it is determined that the user ID of a co-participant that is associated with the schedule ID is not recorded (No in step S601), the position measurement conditions changing unit 1024d of the position measurement conditions setting unit 1024 changes the position measurement cycle of the sensor 312 from the position measurement cycle "3 minutes" for normal operations to the position measurement cycle "15 minutes" for pause operations (step S110).

However, when it is determined that the user ID of a co-participant that is associated with the schedule ID is recorded (Yes in step S601), the current position determination unit 1024g searches the user position information table 510 to acquire the latest position information for the co-participant, and determines whether the latest position information of the co-participant is within the event area (step S602).

When it is determined that the latest position information of the co-participant is not in the event area (No in step S602), the position measurement conditions changing unit 1024d of the position measurement conditions setting unit 1024 changes the position measurement cycle of the sensor 312 from the position measurement cycle "3 minutes" for normal operations to the position measurement cycle "15 minutes" for pause operations (step S110).

However, when it is determined that the latest position information of the co-participant is within the event area (Yes in step S602), the position measurement conditions changing unit 1024d changes the position measurement cycle of the sensor 312, which is installed in the portable terminal device 300 of the user, from the position measurement cycle "3 minutes" for normal operations to the position measurement cycle "15 minutes" for pause operations (step S603). Furthermore, the position measurement conditions changing unit 1024d changes the position measurement cycle of the sensor that is mounted on the portable terminal device (not depicted) of the co-participant to "stop position measurement" (step S604).

Subsequently, the position measurement conditions transmitting unit 125 transmits the position measurement conditions, which have been changed by the position measurement conditions changing unit 1024d of the position measurement conditions setting unit 1024, to the position measurement conditions receiving unit 321 of the portable terminal device 300 of the user and a position measurement conditions receiving unit of the portable terminal device (not depicted) of the co-participant (step S605). The portable terminal device 300 of the user allows the sensor 312 to execute position measurement based on the position measurement conditions that are received by the position measurement conditions receiving unit 321. Thus, the portable terminal device 300 executes the position measurement via the sensor 312 based on the position measurement cycle "15 minutes" for pause operations. In a similar manner, the portable terminal device (not depicted) of the co-participant stops the position measurement performed by the sensor 312, based on the position measurement cycle "stop position measurement".

Subsequently, the time determination unit 124a of the position measurement conditions setting unit 1024 determines whether the current time that is acquired by the time acquiring unit 122 is after the end time of the scheduled event (step S606).

When it is determined that the current time is not after the end time of the scheduled event (No in step S606), the leave determination unit 924e of the position measurement conditions setting unit 1024 refers to the user position information table 510 to determine whether the position information of the user is outside the event area (step S607).

When it is determined that the position information of the user is not outside the event area (No in step S607), the time determination unit 124a of the position measurement conditions setting unit 1024 determines again whether the current time, which is acquired by the time acquiring unit 122, is after the end time of the scheduled event (step S606).

However, when it is determined that the current time is after the end time of the schedule (Yes in step S606) or when it is determined that the position information of the user is outside the event area (Yes in step S607), the current position determination unit 1024g considers that the scheduled event has ended and searches the user position information table 510 to acquire the latest position information of the co-participant and determine whether the latest position information of the co-participant is within the event area (step S608).

When it is determined that the latest position information of the co-participant is not within the event area (No in step S608), the position measurement conditions changing unit 1024d changes only the position measurement cycle of the sensor 312 that is mounted on the portable terminal device 300 of the user from the position measurement cycle "15 minutes" for pause operations to the position measurement cycle "3 minutes" for normal operations (step S609).

Next, the position measurement conditions transmitting unit 125 transmits the position measurement conditions, which is changed by the position measurement conditions changing unit 1024d of the position measurement conditions setting unit 1024, to the position measurement conditions receiving unit 321 of the portable terminal device 300 (step S610). The portable terminal device 300 allows the sensor 312 to execute position measurement based on the position measurement conditions that are received by the position measurement conditions receiving unit 321. Thus, the portable terminal device 300 executes position measurement via the sensor 312 based on the position measurement cycle "3 minutes" for normal operations.

However, when it is determined that the latest position information of the co-participant is within the event area (Yes in step S608), the position measurement conditions changing unit 1024d changes the position measurement cycle of the sensor 312 that is installed in the user's portable terminal device 300 from the position measurement cycle "15 minutes" for pause operations to the position measurement cycle "3 minutes" for normal operations (step S611). Furthermore, the position measurement conditions changing unit 1024d changes the position measurement cycle of the sensor that is installed in the portable terminal device (not depicted) of the co-participant from the position measurement cycle "stop position measurement" to the position measurement cycle "3 minutes" for normal operations (step S612).

Next, the position measurement conditions transmitting unit 125 transmits the position measurement conditions, which is changed by the position measurement conditions changing unit 1024d of the position measurement conditions setting unit 1024, to both of the position measurement conditions receiving unit 321 of the portable terminal device 300 of the user and the position measurement conditions receiving unit of the portable terminal device (not depicted) of the co-participant (step S613). The portable terminal device 300 of the user and the portable terminal device (not depicted) of the co-participant respectively allow the sensor 312 and the sensor (not depicted) of the co-participant's portable terminal device to execute position measurement based on the position measurement conditions that are received by the position measurement conditions receiving unit 321 and the position measurement conditions receiving unit (not depicted) of the co-participant's portable terminal device respectively. Thus, the user's portable terminal device 300 and the co-participant's portable terminal device (not depicted) execute position measurement by using the sensor 312 and the sensor (not depicted) of the co-participant's portable terminal device, respectively, based on the position measurement cycle "3 minutes" for normal operations.

According to the embodiment, when a co-participant of a scheduled event has subscribed to the same server as a user, only the sensor 312 of the portable terminal device 300 of the user is operated after the start time of the scheduled event and the power source of a sensor of the co-participant's portable terminal device (not depicted) is turned off. Then, when it is determined that the scheduled event has ended, the sensor of the co-participant's portable terminal device is turned ON.

Accordingly, power consumption of the sensor of co-participant's portable terminal device may be further reduced and as a result, battery consumption of the co-participant's portable terminal device may be further reduced.

In the above-mentioned embodiments, the start time and end time of a scheduled event are acquired from the schedule tables 530 and 550, which are stored in the second table storage unit 221. However, embodiments of the present disclosure are not limited to this. For example, the start time and end time of a scheduled event may be acquired based on schedule information that is stored in the main memory 302 or the auxiliary memory 303 of the portable terminal device 300.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system that controls position measurement performed by a position measurement device, the system comprising:
   circuitry configured to
      acquire schedule information associated with the position measurement device and including a start time and an end time,
      acquire position information acquired by the position measurement device,
      extend a position measurement cycle of the position measurement device compared to a position measurement cycle before the start time of the schedule information when positions respectively corresponding to a plurality of pieces of position information acquired between the start time and the end time are in a given area,
      control transmission of a notification of the position measurement cycle over a network to the position measurement device communicatively coupled to the system via the network, and
      stop position measurement of a different position measurement device that is used by a third party, the third party being different from a user of the position measurement device when a position corresponding to position information of the third party is determined to be in the given area after the position measurement cycle is extended, the schedule information being associated with identification information of the third party.

2. The system according to claim 1, wherein the circuitry is further configured to:
   determine whether to extend the position measurement cycle based on a type of the schedule information.

3. The system according to claim 1, wherein the circuitry is further configured to:
   determine whether to extend the position measurement cycle based on an amount of time from the start time to the end time.

4. The system according to claim 1, wherein the circuitry is further configured to:
   shorten the position measurement cycle as an amount of time until the end time of the schedule information becomes shorter after the position measurement cycle is extended.

5. The system according to claim 1, wherein the circuitry is further configured to:
   shorten the position measurement cycle when a position corresponding to position information acquired by the position measurement device is determined to be outside the given area after the position measurement cycle is extended and before the end time of the schedule information.

6. The system according to claim 1, wherein the circuitry is further configured to:
   identify the given area based on the plurality of pieces of position information.

7. The system according to claim 1, wherein the circuitry is configured to:
   determine whether the positions are in the given area, and extend the position measurement cycle when the positions are determined to be in the given area.

8. The system according to claim 1, wherein the circuitry is further configured to:
   shorten the position measurement e cycle after the end time of the schedule information.

9. An information processing method for controlling position measurement performed by a positioned measurement device, the method comprising:
   acquiring schedule information associated with the position measurement device and including a start time and an end time,
   acquiring position information acquired by the position measurement device,
   extending a position measurement cycle of the position measurement device compared to a position measurement cycle before the start time of the schedule information when positions that respectively correspond to a plurality of pieces of position information acquired between the start time and the end time are in a given area,
   controlling transmission of a notification of the position measurement cycle over a network to the position measurement device, and
   stopping position measurement of a different position measurement device that is used by a third party, the third party being different from a user of the position measurement device when a position corresponding to position information of the third party is determined to be in the given area after the position measurement cycle is extended, the schedule information being associated with identification information of the third party.

10. The system according to claim 1, further comprising: the position measurement device.

11. The information processing method according to claim 9, further comprising:

determining whether to extend the position measurement cycle based on a type of the schedule information.

12. The information processing method according to claim 9, further comprising:
determining whether to extend the position measurement cycle based on an amount of time from the start time to the end time.

13. The information processing method according to claim 9, further comprising:
shortening the position measurement cycle as an amount of time until the end time of the schedule information becomes shorter after the position measurement cycle is extended.

14. The information processing method according to claim 9, further comprising:
shortening the position measurement cycle when a position corresponding to position information acquired by the position measurement device is determined to be outside the given area after the position measurement cycle is extended and before the end time of the schedule information.

15. The information processing method according to claim 9, further comprising:
deciding the given area based on the plurality of pieces of position information.

16. The information processing method according to claim 9, further comprising:
determining whether the positions are in the given area, wherein
the extending extends the position measurement cycle when the positions are determined to be in the given area.

17. The information processing method according to claim 9, further comprising:
shortening the position measurement cycle after the end time of the schedule information.

* * * * *